United States Patent
Hoshi et al.

(10) Patent No.: US 10,907,561 B2
(45) Date of Patent: Feb. 2, 2021

(54) ESTIMATION DEVICE AND CONTROL DEVICE FOR COMBUSTION SYSTEM

(71) Applicant: DENSO CORPORATION, Kariya (JP)

(72) Inventors: Shinya Hoshi, Kariya (JP); Atsunori Okabayashi, Kariya (JP)

(73) Assignee: DENSO CORPORATION, Kariya (JP)

( * ) Notice: Subject to any disclaimer, the term of this patent is extended or adjusted under 35 U.S.C. 154(b) by 315 days.

(21) Appl. No.: 15/773,625

(22) PCT Filed: Sep. 13, 2016

(86) PCT No.: PCT/JP2016/076881
§ 371 (c)(1),
(2) Date: May 4, 2018

(87) PCT Pub. No.: WO2017/081933
PCT Pub. Date: May 18, 2017

(65) Prior Publication Data
US 2019/0063356 A1   Feb. 28, 2019

(30) Foreign Application Priority Data

Nov. 12, 2015   (JP) .................. 2015-222319

(51) Int. Cl.
| | |
|---|---|
| *F02D 41/14* | (2006.01) |
| *F02D 19/08* | (2006.01) |
| *F02D 41/40* | (2006.01) |
| *F02D 35/02* | (2006.01) |
| *F02D 41/04* | (2006.01) |
| *F02D 41/38* | (2006.01) |

(52) U.S. Cl.
CPC ....... *F02D 41/1458* (2013.01); *F02D 19/088* (2013.01); *F02D 35/02* (2013.01);
(Continued)

(58) Field of Classification Search
CPC ...... F02D 35/02; F02D 35/028; F02D 41/402; F02D 41/403; F02D 41/047;
(Continued)

(56) References Cited

U.S. PATENT DOCUMENTS

| | | | | |
|---|---|---|---|---|
| 2006/0107651 | A1* | 5/2006 | Miyake | F02M 26/46 60/285 |
| 2010/0012081 | A1* | 1/2010 | Ashizawa | F02B 23/101 123/301 |
| 2015/0252745 | A1* | 9/2015 | Naruse | F02D 41/3005 123/294 |

(Continued)

FOREIGN PATENT DOCUMENTS

| | | |
|---|---|---|
| JP | 2012-255392 | 12/2012 |
| JP | 2013-204521 | 10/2013 |
| JP | 2015-169127 | 9/2015 |

OTHER PUBLICATIONS

U.S. Appl. No. 15/773,578 of Hoshi, et al., filed May 4, 2018, entitled Estimation Device and Control Device for Combustion System (72 pages).

(Continued)

*Primary Examiner* — Sizo B Vilakazi
(74) *Attorney, Agent, or Firm* — Nixon & Vanderhye P.C.

(57) ABSTRACT

An estimation device is applicable to a combustion system including an internal combustion engine. The estimation device includes a mixing acquisition unit, a combustion amount estimation unit, and a region estimation unit. The mixing acquisition unit acquires the mixing ratio of various components contained in the fuel used for combustion in the internal combustion engine. The combustion amount estimation unit estimates a main combustion amount of the fuel caused by a main combustion produced by injecting the fuel into a combustion chamber of the internal combustion engine with a main injection, based on the mixing ratio acquired by the mixing acquisition unit. The region estimation unit estimates a combustion region of the main combustion in the combustion chamber based on the mixing ratio acquired by the mixing acquisition unit.

6 Claims, 13 Drawing Sheets

(52) U.S. Cl.
CPC ......... *F02D 35/028* (2013.01); *F02D 41/047* (2013.01); *F02D 41/402* (2013.01); *F02D 41/403* (2013.01); F02D 35/023 (2013.01); F02D 2041/1433 (2013.01); F02D 2041/389 (2013.01); F02D 2200/0612 (2013.01)

(58) Field of Classification Search
CPC ............... F02D 19/088; F02D 41/1458; F02D 2041/389; F02D 2200/0612; F02D 2041/1433; F02D 35/023
See application file for complete search history.

(56) References Cited

U.S. PATENT DOCUMENTS

2016/0363084 A1* 12/2016 Hoshi ................. F02D 41/0025
2018/0320628 A1* 11/2018 Okabayashi .......... F02D 35/028

OTHER PUBLICATIONS

U.S. Appl. No. 15/773,583 of Hoshi, et al., filed May 4, 2018, entitled Estimation Device and Control Device for Combustion System (52 pages).
U.S. Appl. No. 15/773,584 of Hoshi, et al., filed May 4, 2018, entitled Estimation Device and Control Device for Combustion System (66 pages).
U.S. Appl. No. 15/773,590 of Hoshi, et al., filed May 4, 2018, entitled Estimation Device and Control Device for Combustion System (70 pages).
U.S. Appl. No. 15/773,604 of Okabayashi, et al., filed May 4, 2018, entitled Combustion System Estimation Device and Control Device, (70 pages).

* cited by examiner

FIG. 3

$$\begin{Bmatrix} \text{MIXING AMOUNT OF} \\ \text{LINEAR PARAFFINS} \\ \text{MIXING AMOUNT OF NAPHTHENES} \\ \text{MIXING AMOUNT OF} \\ \text{SIDE CHAIN PARAFFINS} \\ \text{MIXING AMOUNT OF AROMATICS} \\ \vdots \end{Bmatrix} = \begin{Bmatrix} a_{00} & \cdots & a_{0Y} \\ \vdots & \ddots & \vdots \\ a_{X0} & \cdots & a_{XY} \end{Bmatrix} \cdot \begin{Bmatrix} \text{IGNITION DELAY TIME TD}(i) & : P(i), T(i), O_2(i), P_c(i) \\ \text{IGNITION DELAY TIME TD}(j) & : P(j), T(j), O_2(j), P_c(j) \\ \text{IGNITION DELAY TIME TD}(k) & : P(k), T(k), O_2(k), P_c(k) \\ \text{IGNITION DELAY TIME TD}(l) & : P(l), T(l), O_2(l), P_c(l) \\ \cdots & \end{Bmatrix}$$

MOLECULAR STRUCTURAL SPECIES        CONSTANTS        FLAMMABILITY PARAMETERS

FIG. 4
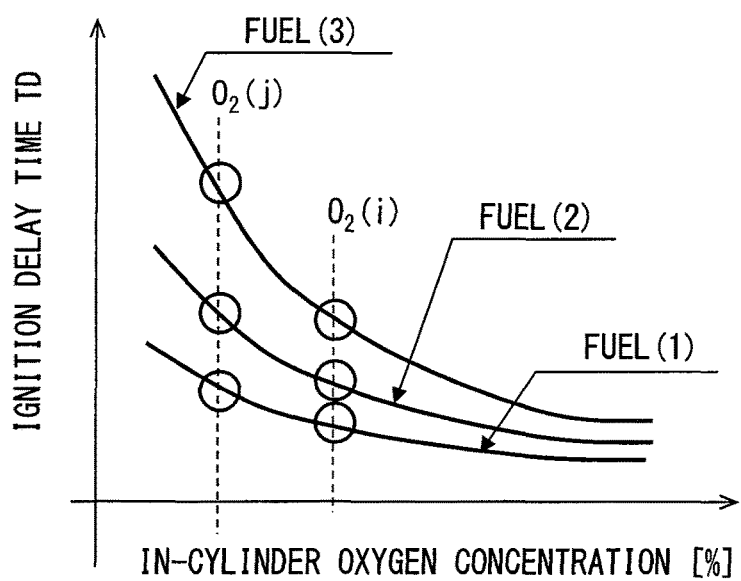
FIG. 5
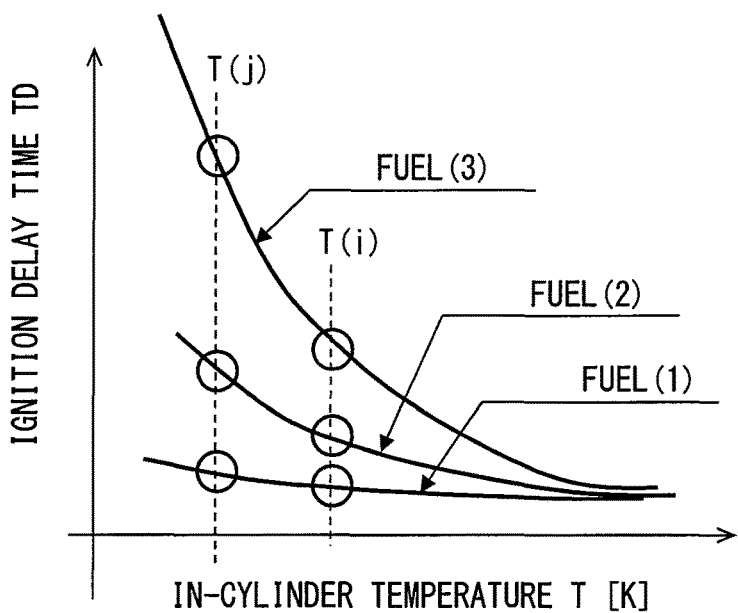
FIG. 6
|  | MOLECULAR STRUCTURE TYPE A | MOLECULAR STRUCTURE TYPE B | MOLECULAR STRUCTURE TYPE C |
|---|---|---|---|
| FUEL (1) | LARGE | LARGE | SMALL |
| FUEL (2) | SMALL | LARGE | SMALL |
| FUEL (3) | LARGE | SMALL | LARGE |

FIG. 12

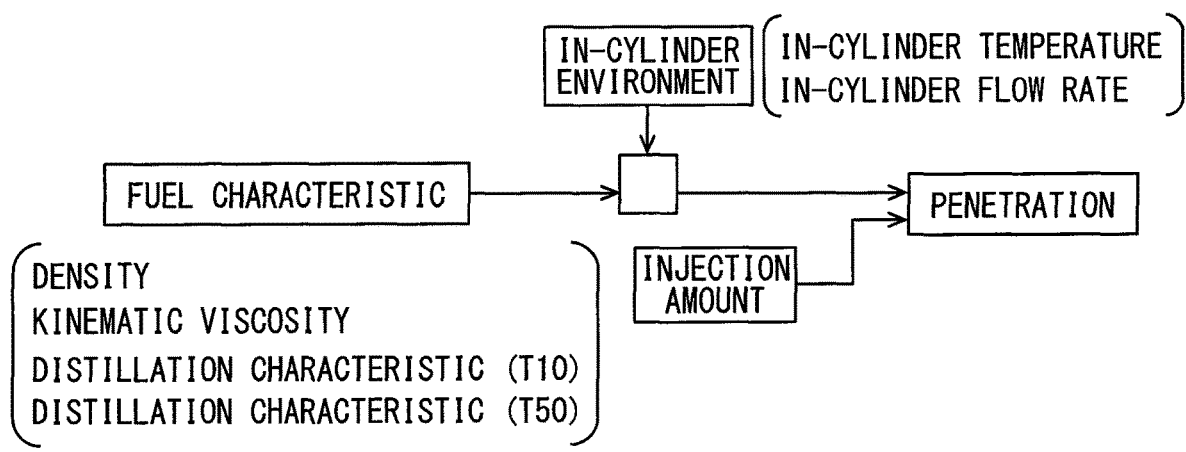

FIG. 13

$$\begin{pmatrix} \text{PENETRATION P1} \\ \text{PENETRATION P2} \\ \text{PENETRATION P3} \\ \ldots \end{pmatrix} = \begin{bmatrix} b_{00} & \cdots & b_{0Y} \\ \vdots & \ddots & \vdots \\ b_{X0} & \cdots & b_{XY} \end{bmatrix} \cdot \begin{pmatrix} \text{KINEMATIC VISCOSITY} \\ \text{DENSITY} \\ \text{DISTILLATION CHARACTERISTIC : T10} \\ \text{DISTILLATION CHARACTERISTIC : T50} \\ \ldots \end{pmatrix}$$

FIG. 14

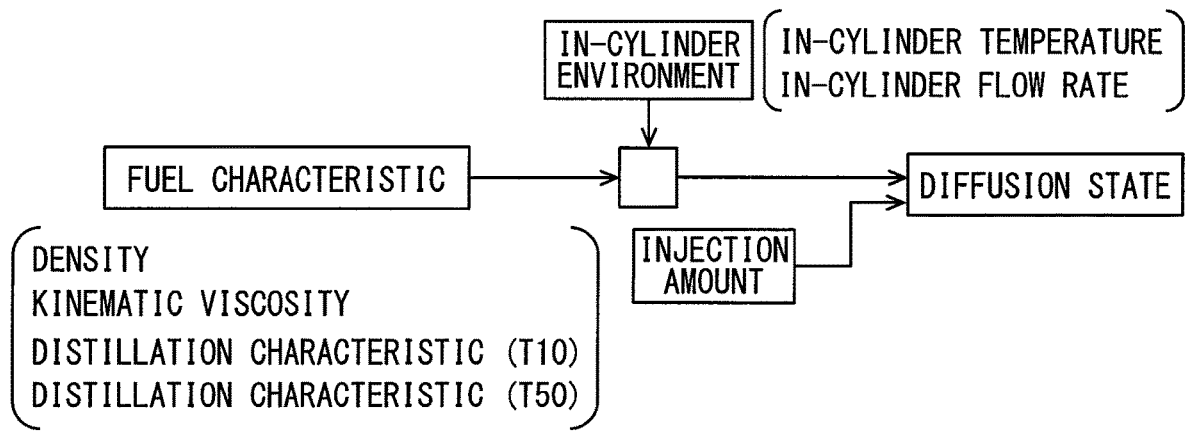

FIG. 15

$$\begin{pmatrix} \text{DIFFUSION STATE D1} \\ \text{DIFFUSION STATE D2} \\ \text{DIFFUSION STATE D3} \\ \cdots \end{pmatrix} = \begin{pmatrix} c_{00} & \cdots & c_{0Y} \\ \vdots & \ddots & \vdots \\ c_{X0} & \cdots & c_{XY} \end{pmatrix} \cdot \begin{pmatrix} \text{KINEMATIC VISCOSITY} \\ \text{DENSITY} \\ \text{DISTILLATION} \\ \text{CHARACTERISTIC : T10} \\ \text{DISTILLATION} \\ \text{CHARACTERISTIC : T50} \\ \cdots \end{pmatrix}$$

FIG. 16

$$\underbrace{Q_{burn}[\text{J}]}_{\substack{\text{COMBUSTION} \\ \text{AMOUNT}}} = \underbrace{\alpha\,[-]}_{\substack{\text{COMBUSTION} \\ \text{RATE}}} \cdot \underbrace{\rho\,[\text{g/mm}^3]}_{} \cdot \underbrace{Q_{inj}[\text{mm}^3/\text{st}]}_{\substack{\text{INJECTION} \\ \text{AMOUNT}}} \cdot \underbrace{A\,[\text{J/g}]}_{\substack{\text{LOWER} \\ \text{HEAT GENERATION} \\ \text{AMOUNT}}}$$

FIG. 17

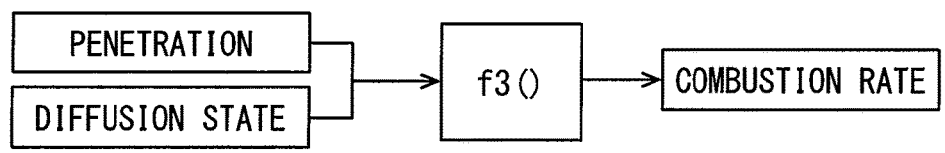

$$Qi = \int dQi \frac{Vi}{Va} dt \quad \cdots \quad (2)$$

ESTIMATION DEVICE AND CONTROL DEVICE FOR COMBUSTION SYSTEM

CROSS REFERENCE TO RELATED APPLICATION

This application is the U.S. national phase of International Application No. PCT/JP2016/076881 filed Sep. 13, 2016, which designated the U.S. and claims priority to Japanese Patent Application No. 2015-222319 filed on Nov. 12, 2015, the entire contents of each of which are incorporated herein by reference.

TECHNICAL FIELD

The present disclosure relates to an estimation device for estimating a combustion state caused by a main injection in a combustion system and to a control device for controlling the combustion system.

BACKGROUND ART

Conventionally, a known technique for a combustion system having an internal combustion engine is multistage injection to inject a fuel into a combustion chamber for multiple times in one combustion cycle. The combustion system includes a fuel injection valve injecting a fuel into a combustion chamber. In the fuel injection valve, an execution and a stop of a fuel injection is controlled by controlling an energization of an actuator. In Patent Literature 1, for example, an ECU as a control device acquires a cooling loss of the internal combustion engine caused by a coolant as a cooling loss index by, and controls an injection timing of a main injection in a multistage injection based on the cooling loss index.

PRIOR ART LITERATURE

Patent Literature

Patent Literature 1: JP2013-204521A

However, a fuel having various properties exist as a fuel used for combustion in internal combustion engines. Thus, when components contained in the fuel differ from each other or when the mixing ratio of the components differs, it is possible that a timing that fuel is actually injected from the fuel injection valve differs in fuel even though the energization timing of the fuel relating to the fuel injection valve is constant. In this case, the cooling loss of the internal combustion engine caused by the coolant cannot be managed appropriately.

SUMMARY OF INVENTION

It is an object of the present disclosure to produce an estimation device and a control device to enable to appropriately manage a cooling loss caused by a main injection in a combustion system.

According to a first mode of the present disclosure, an estimation device is applicable to a combustion system having an internal combustion engine and includes a mixing acquisition unit to acquire a mixing ratio of various components contained in fuel used for combustion in the internal combustion engine. The estimation device further includes a combustion amount estimation unit to estimate a main combustion amount of the fuel caused by a main combustion generated by injecting the fuel into a combustion chamber of the internal combustion engine by the main injection, based on the mixing ratio acquired by the mixing acquisition unit. The estimation device further includes a region estimation unit to estimate a combustion region of the main combustion in the combustion chamber based on the mixing ratio acquired by the mixing acquisition unit.

According to a second mode of the present disclosure, an estimation device is applicable to a combustion system having an internal combustion engine and includes a mixing acquisition unit to acquire a mixing ratio of various components contained in fuel used for combustion in the internal combustion engine. The estimation device further includes a heat generation amount estimation unit to estimate a generation amount of the fuel caused by the main injection produced by injecting the fuel into a combustion chamber of the internal combustion engine, based on the mixing ratio. The estimation device further includes a penetration force estimation unit to estimate a penetration force of the fuel caused by the main injection, based on the mixing ratio.

According to a third mode of the present disclosure, a control device is applicable to a combustion system having an internal combustion engine and includes a mixing acquisition unit to acquire a mixing ratio of various components contained in fuel used for combustion in the internal combustion engine. The control device further includes a combustion amount estimation unit to estimate a main combustion amount of the fuel caused by a main combustion generated by injecting the fuel into a combustion chamber of the internal combustion engine by the main injection, based on the mixing ratio acquired by the mixing acquisition unit. The control device further includes a region estimation unit to estimate a combustion region of the main combustion in the combustion chamber based on the mixing ratio acquired by the mixing acquisition unit. The control device further includes a combustion control unit to control the combustion system based on respective estimation results of the combustion amount estimation unit and the region estimation unit.

BRIEF DESCRIPTION OF DRAWINGS

The above and other objects, features and advantages of the present disclosure will become more apparent from the following detailed description made with reference to the accompanying drawings. In the drawings:

FIG. 3 is a diagram illustrating a relationship among multiple ignition delay times, parameters representing flammability, and mixing amounts of various components;

FIG. 4 is a diagram showing a relationship between a characteristic line representing a change in the ignition delay time caused due to an in-cylinder oxygen concentration and a molecular structural species of a fuel;

FIG. 5 is a diagram showing a relationship between the characteristic line representing a change in the ignition delay time caused due to an in-cylinder temperature and a molecular structural species of the fuel;

FIG. 6 is a view showing a relationship between a characteristic line specified based on an ignition delay time and a mixing ratio of a molecular structural species;

FIG. 12 is a diagram illustrating estimation of the penetration as an injection parameter;

FIG. 13 is a diagram showing a formula for estimating the penetration;

FIG. 14 is a diagram illustrating estimation of a diffusion state as the injection parameter;

FIG. 15 is a diagram showing a formula for estimating the diffusion state;

FIG. 16 is a diagram showing a formula for estimating a combustion amount as the combustion parameter;

FIG. 17 is a diagram showing a formula for estimating a combustion rate;

DESCRIPTION OF EMBODIMENTS

Figure 1:
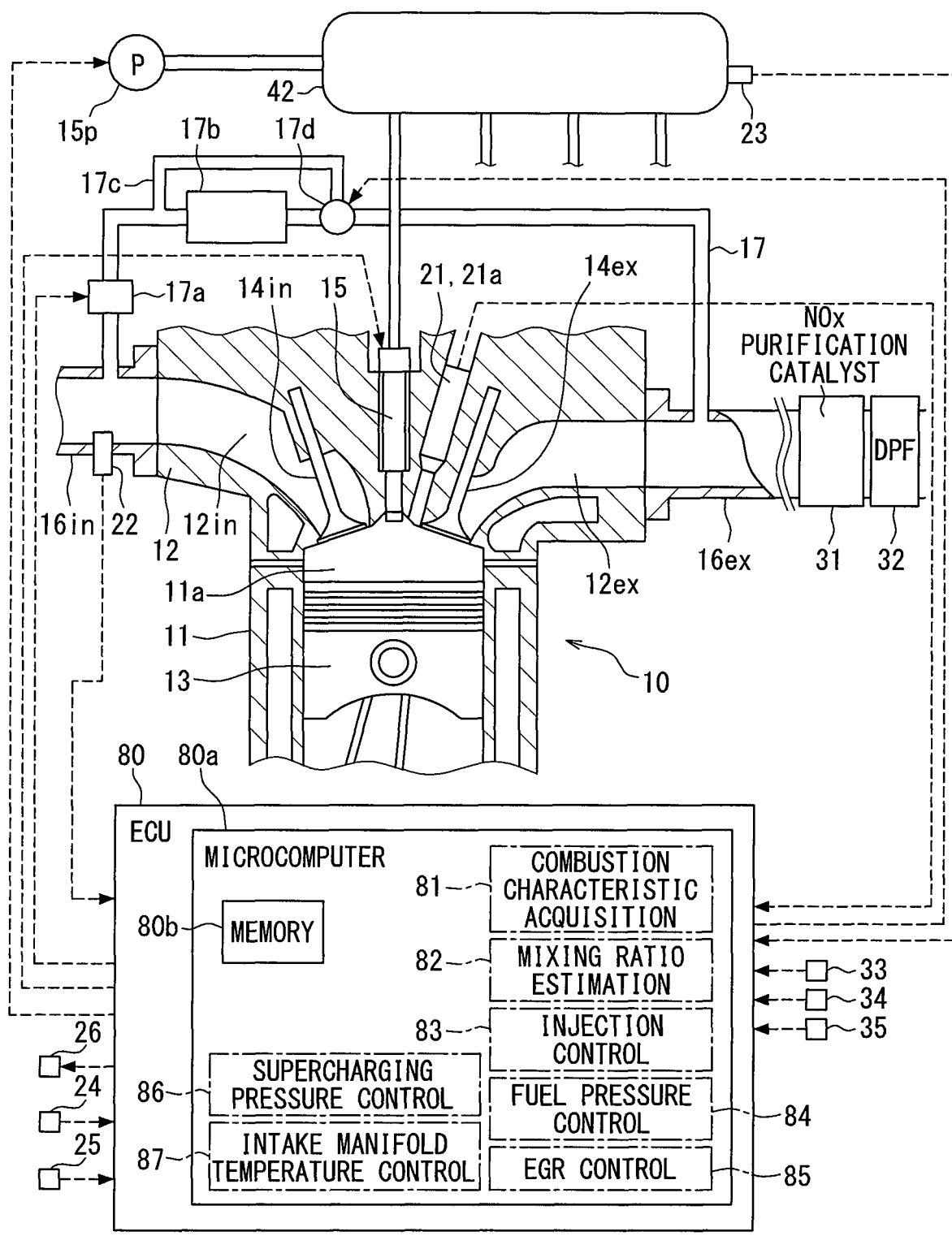
FIG. 1 is a schematic diagram of a combustion system according to a first embodiment.

Hereinafter, multiple embodiments for carrying out the present disclosure will be described with reference to accompanying drawings. In the following description of the embodiments, the same reference numerals will be used to refer to the same and already described elements and description thereof will be omitted in some cases. When only a part of a configuration in each embodiment is changed, the other parts of the configuration can be configured as the same as a prior embodiment.

First Embodiment

An estimation device and a control device for a combustion system according to the present embodiment are produced with an electronic control device (for example, ECU 80) shown in FIG. 1. The ECU 80 includes a microcomputer (for example, microcomputer 80a), an input processing circuit, an output processing circuit, and the like (none shown). The microcomputer 80a includes a central processing unit (for example, CPU) not shown and a memory 80b. The CPU executes a predetermined program stored in the memory 80b, thereby to cause the microcomputer 80a to control the operation of a fuel injection valve 15, a fuel pump 15p, an EGR valve 17a, a temperature control valve 17d, and a supercharging pressure regulator 26 and the like included in the combustion system. Under those controls, a combustion state of the internal combustion engine 10 in the combustion system is controlled in a desired state. The combustion system and the ECU 80 are mounted in a vehicle, and the vehicle travels with the use of an output power of the internal combustion engine 10 as a driving source.

The internal combustion engine 10 includes a cylinder block 11, a cylinder head 12, a piston 13, and the like. An intake valve 14in, an exhaust valve 14ex, a fuel injection valve 15, and an in-cylinder pressure sensor 21 are equipped to the cylinder head 12.

The fuel pump 15p pumps a fuel in the fuel tank to a common rail 15c. The ECU 80 controls the operation of the fuel pump 15p, as a result of which the fuel in the common rail 15c is stored in the common rail 15c in a state where the fuel is maintained at a target pressure Ptrg. The common rail 15c distributes the accumulated fuel to the fuel injection valves 15 of the respective cylinders. The fuel injected from the fuel injection valve 15 mixes with an intake air in the combustion chamber 11a to form an air-fuel mixture, and the air-fuel mixture is compressed by the piston 13 and self-ignited. In short, the internal combustion engine 10 is a compression self-ignition type diesel engine, and a light oil is used as the fuel. Incidentally, as the fuel injection by the fuel injection valve 15, there is spray spraying the fuel in the form of mist.

The fuel injection valve 15 is configured by accommodating an electromagnetic actuator and a valve body inside a body. When the ECU 80 causes the energization of the electromagnetic actuator, an electromagnetic attraction force of the electromagnetic actuator causes a leak passage of a back pressure chamber (not shown) to open. The valve body opens in association with a reduction in the back pressure, and an injection hole provided in the body is opened. Thus, the fuel is injected from the injection hole. When the energization is turned off, the valve body is closed and the fuel injection is stopped.

An intake pipe 16in and an exhaust pipe 16ex are connected to an intake port 12in and an exhaust port 12ex, which are provided in the cylinder head 12, respectively. The intake pipe 16in and the exhaust pipe 16ex are connected with an EGR pipe 17, and a part of an exhaust gas (that is, an EGR gas) is introduced (returned) into the intake pipe 16in through the EGR pipe 17. An EGR valve 17a is equipped to the EGR pipe 17. The ECU 80 controls the operation of the EGR valve 17a, thereby to control an opening degree of the EGR pipe 17, and to control a flow rate of the EGR gas.

Furthermore, an EGR cooler 17b for cooling the EGR gas, a bypass pipe 17c, and a temperature control valve 17d are equipped to an upstream portion of the EGR valve 17a of the EGR pipe 17. The bypass pipe 17c defines a bypass flow channel that causes the EGR gas to bypass the EGR cooler 17b. The temperature control valve 17d adjusts the opening degree of the bypass flow channel, thereby to adjust a ratio between the EGR gas flowing through the EGR cooler 17b and the EGR gas flowing through the bypass flow channel, and finally to adjust a temperature of the EGR gas flowing into the intake pipe 16in. In this case, the intake gas flowing into the intake port 12in includes an exterior air (fresh air) flowing from the intake pipe 16in and the EGR gas. Therefore, the adjustment of the temperature of the EGR gas with the temperature control valve 17d represents the adjustment of the temperature (that is, intake manifold temperature) of the intake air flowing into the intake port 12in.

The combustion system is provided with a supercharger not shown. The supercharger has a turbine that is attached to the exhaust pipe 16ex and a compressor that is attached to the intake pipe 16in. When the turbine rotates according to a flow-rate energy of the exhaust gas, the compressor rotates by a rotational force of the turbine, and the fresh air is compressed (supercharged) by the compressor. The supercharging pressure regulator 26 described above is a device for changing a capacity of the turbine. The ECU 80 controls the operation of the supercharging pressure regulator 26 to adjust the turbine capacity, thereby to control a supercharging pressure caused by the compressor.

In addition, the combustion system includes a NOx purification catalyst 31 and a DPF 32. The NOx purification catalyst 31 includes an adsorption catalyst that adsorbs nitrogen oxide NOx in the exhaust gas, a reduction catalyst that reduces NOx to nitrogen $N_2$, and the like. The DPF 32 (Diesel Particulate Filter) is a fine particle collecting device that is located in the further downstream side of the NOx purification catalyst 31, and collects fine particles contained in the exhaust gas. The exhaust gas flowing through the exhaust pipe 16ex passes through both of the NOx purification catalyst 31 and the DPF 32 and is subsequently discharged from a downstream end of the exhaust pipe 16ex. In the combustion system, the NOx purification catalyst 31 and the DPF 32 configure an exhaust gas purification device.

The ECU 80 receives detection signals from various sensors such as the in-cylinder pressure sensor 21, an oxygen concentration sensor 22, a rail pressure sensor 23, a crank angle sensor 24, an accelerator pedal sensor 25, an exhaust gas temperature sensor 33, an exhaust gas pressure sensor 34, and a catalyst temperature sensor 35.

The in-cylinder pressure sensor 21 outputs the detection signal depending on a pressure (hereafter, a cylinder pressure) in the combustion chamber 11a. The in-cylinder pressure sensor 21 has a temperature detection element 21a in addition to the pressure detection element, and outputs a detection signal corresponding to a temperature (hereafter, in-cylinder temperature) of the combustion chamber 11a. The oxygen concentration sensor 22 is equipped to the intake pipe 16in and outputs a detection signal corresponding to an oxygen concentration in the intake air. The intake air to be detected is a mixture of fresh air and EGR gas. The rail pressure sensor 23 is mounted to the common rail 15c, and outputs the detection signal depending on a pressure (hereafter, rail pressure) of the fuel accumulated in the common rail 15c. The crank angle sensor 24 outputs a detection signal corresponding to the rotational speed (for example, engine speed) of the crankshaft that is rotationally driven by the piston 13. The accelerator pedal sensor 25 outputs the detection signal depending on a pressing position (for example, engine load) of an accelerator pedal which is operated by a driver of the vehicle.

The exhaust gas temperature sensor 33 is equipped to the exhaust pipe 16ex, and detects an exhaust gas temperature. The exhaust gas pressure sensor 34 is equipped to the exhaust pipe 16ex, and detects an exhaust gas pressure. The exhaust gas temperature sensor 33 and the exhaust gas pressure sensor 34 are located between the NOx purification catalyst 31 and the turbine in the exhaust pipe 16ex.

The catalyst temperature sensor 35 is located between the NOx purification catalyst 31 and the DPF 32 in the exhaust pipe 16ex and detects an internal temperature of the NOx purification catalyst 31, thereby to detect the temperature of the exhaust gas that has passed through the NOx purification catalyst 31. The catalyst temperature sensor 35 may be equipped to the NOx purification catalyst 31.

The ECU 80 controls operations of the fuel injection valve 15, the fuel pump 15p, the EGR valve 17a, the temperature control valve 17d, and the supercharging pressure regulator 26, based on the respective detection signals of the sensors 21 to 25 and 33 to 35. In this way, a fuel injection start timing, the injection amount, an injection pressure, an EGR gas flow rate, an intake manifold temperature and a supercharging pressure are controlled.

While controlling the operation of the fuel injection valve 15, the microcomputer 80a functions as an injection control unit 83 to control the fuel injection start timing, the injection amount, and the number of injection stages related to the multistage injection. There is a case where the injection control is performed so that the same fuel injection valve 15 injects the fuel for multiple times (that is, multistage injection) during one combustion cycle. The multiple injection include a main injection with the largest injection amount, a pilot injection performed at a timing before the main injection, and an after injection or a post injection performed at a timing after the main injection.

While controlling the operation of the fuel pump 15p, the microcomputer 80a functions as a fuel pressure control unit 84 that controls the injection pressure. While controlling the operation of the EGR valve 17a, the microcomputer 80a functions as an EGR control unit 85 that controls the EGR gas flow rate. While controlling the operation of the temperature control valve 17d, the microcomputer 80a functions as an intake manifold temperature control unit 87 that controls the intake manifold temperature. While controlling the operation of the supercharging pressure regulator 26, the microcomputer 80a functions as a supercharging pressure control unit 86 that controls the supercharging pressure.

Figure 2:
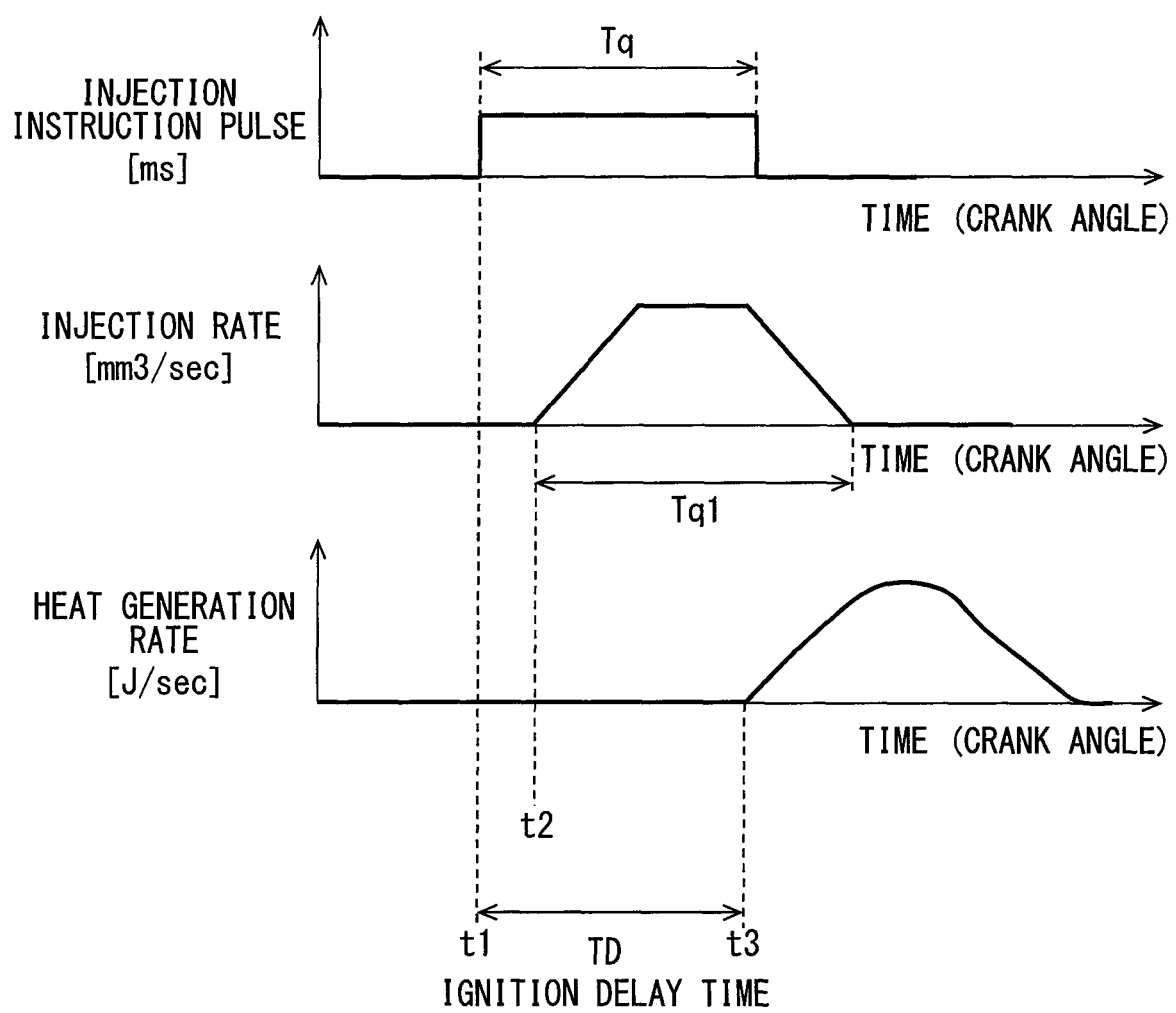
FIG. 2 is an illustrative diagram of an ignition delay time.

The microcomputer 80a also functions as a combustion characteristic acquisition unit 81 that acquires a detection value (that is, combustion characteristic value) of a physical quantity relating to combustion. The combustion characteristic value according to the present embodiment represents an ignition delay time TD shown in FIG. 2. An upper part of FIG. 2 shows a pulse signal output from the microcomputer 80a. Energization of the fuel injection valve 15 is controlled according to the pulse signal. Specifically, the energization is started at a time point t1 when the pulse is on, and the energization continues in a pulse on period Tq. In short, the injection start timing is controlled according to the pulse on timing. Further, the pulse on period Tq controls an injection time period of the fuel, and then controls the injection amount.

A middle part of FIG. 2 shows a change in an injection state of the fuel from the injection hole, which results from the valve opening operation and the valve closing operation of the valve body according to the pulse signal. Specifically, an injection rate indicates the injection amount of the fuel injected per unit time. As shown in the drawing, there is a time lag from the time point t1, when energization is started, to a time period t2 when the injection is actually started. There is also a time lag from an energization completion time point until the injection is actually stopped. A period Tq1 in which the injection is actually performed is controlled according to a pulse on period Tq.

A lower part of FIG. 2 shows a change in the combustion state of the injected fuel in the combustion chamber 11a. Specifically, the heat generation rate indicates a heat amount where the mixing gas including the fuel and the intake gas is self-ignited per unit time. As shown in the drawing, there is a time lag from the time point t2 of the injection start to a time point t3 when the combustion actually starts. In the present embodiment, a time from the time point t1, at which the energization starts, to the time point t3, at which the combustion starts, is defined as an ignition delay time TD.

The combustion characteristic acquisition unit 81 estimates the time point t3, when the combustion starts, based on the change in the in-cylinder pressure detected with the in-cylinder pressure sensor 21. Specifically, in a time period from a time point that the piston 13 reaches a top dead center to a time point that a crank angle rotates by a predetermined value, the combustion parameter acquisition unit 81 estimates a time point that the cylinder pressure rapidly increases as the combustion start time point (for example, the time point t3). The ignition delay time TD is calculated by the combustion characteristic acquisition unit 81 based on the estimation result. Further, the combustion characteristic acquisition unit 81 acquires various states (that is, combustion conditions) at the time of combustion for each combustion. Specifically, the in-cylinder pressure, the in-cylinder temperature, the intake oxygen concentration, and the injection pressure are acquired as combustion conditions.

Those combustion conditions are parameters expressing a flammability of the fuel. The air-fuel mixture is more likely to self-ignite and likely to burn as the in-cylinder pressure immediately before the combustion is higher, as the in-cylinder temperature immediately before the combustion is higher, as the intake oxygen concentration is higher, and as the injection pressure is higher. As the in-cylinder pressure and the in-cylinder temperature just before the combustion, for example, a value detected at the time point t1 at which the energization of the fuel injection valve 15 is started may be used. The in-cylinder pressure is detected with the in-cylinder pressure sensor 21. The in-cylinder temperature is detected with the temperature detection element 21a. The intake oxygen concentration is detected with the oxygen concentration sensor 22. The injection pressure is detected with the rail pressure sensor 23. The combustion characteristic acquisition unit 81 stores the acquired ignition delay time TD in the memory 80b in association to the parameters (that is, combustion conditions) related to the combustion.

The microcomputer 80a also functions as a mixing ratio estimation unit 82 to estimate the mixing ratio of the molecular structural species contained in the fuel based on the multiple combustion characteristic values detected under the different combustion conditions. For example, the microcomputer 80a substitutes the ignition delay time TD for each different combustion condition into a determinant shown in FIG. 3 to calculate the mixing amount of the molecular structural species. The microcomputer 80a divides each of the calculated mixing amounts by the total amount, thereby to calculate the mixing ratio of the molecular structural species.

A matrix on the left side of FIG. 3 has x rows and one column and includes x numbers. Those numerical values represent the mixing amounts of various components. The various components are classified according to the type of molecular structure. Types of molecular structure include linear paraffins, side chain paraffins, naphthenes and aromatics.

The matrix on the left side of the right side is x rows and y columns, and has numerical values such as a00 . . . aXY. Those numerical values are constants determined on the basis of tests conducted in advance. The matrix on the right side of the right hand is y row 1 column and has y numbers. Those numerical values are the ignition delay time TD acquired with the combustion characteristic acquisition unit 81. For example, a numerical value of a first row and a first column represents an ignition delay time TD(i) acquired under a combustion condition i set in a predetermined combination of the parameters, and a numerical value of a second row and the first column represents an ignition delay time TD(j) acquired under a combustion condition j. All of the parameters are set to different values between the combustion condition i and the combustion condition j. Symbols P(i), T(i), O2(i) and Pc(i) in FIG. 3 indicate the in-cylinder pressure, the in-cylinder temperature, the intake oxygen concentration, and the injection pressure under the combustion condition i, respectively. Symbols P(j), T(j), O2(j) and Pc(j) indicate the respective parameters under the combustion condition j.

Subsequently, a description will be made on a theory that the mixing amount of the molecular structural species can be calculated by substituting the ignition delay time TD for each combustion condition in the determinant of FIG. 3 with reference to FIGS. 4, 5, and 6.

As shown in FIG. 4, since the mixing gas becomes more easily self-ignited when the concentration (hereafter, the in-cylinder oxygen concentration) of the oxygen included in the mixing gas in the combustion becomes higher, the ignition delay time TD becomes shorter. Three solid lines (1), (2) and (3) in the drawing are characteristic lines showing the relationship between an in-cylinder oxygen concentration and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder oxygen concentration is O2(i), it can be estimated which molecular structural species is targeted. In particular, by comparing the ignition delay time TD in a case where the in-cylinder oxygen concentration is O2(i) with the ignition delay time TD in a case where the in-cylinder oxygen concentration is O2(j), the mixing ratio can be estimated with higher precision.

Similarly, as shown in FIG. 5, since the self-ignition tends to occur more easily as the in-cylinder temperature becomes higher, the ignition delay time TD becomes shorter. Three solid lines (1), (2) and (3) in the drawing are characteristic lines showing a relationship between the in-cylinder temperature and the ignition delay time TD. However, the characteristic lines vary depending on the fuel. Strictly, the characteristic lines vary depending on the mixing ratio of the respective molecular structural species contained in the fuel. Therefore, by detecting the ignition delay time TD when the in-cylinder temperature is B1, it can be estimated which molecular structural species is targeted. In particular, by comparing the ignition delay time TD in a case where the in-cylinder temperature is T(i) with the ignition delay time TD in a case where the in-cylinder temperature is T(j), the mixing ratio can be estimated with higher precision.

Further, the molecular structural species highly influenced by the characteristic line relating to the in-cylinder oxygen concentration (refer to FIG. 4) is different from the molecular structural species highly influenced by the characteristic line relating to the in-cylinder temperature (refer to FIG. 5). As described above, the molecular structural species having a high degree of influence is different according to the characteristic lines relating to the respective multiple combustion conditions. Therefore, based on the combination of the ignition delay times TD obtained by setting the multiple parameters (for example, combustion conditions) to different values, it can be estimated which of the molecular structural species has a high mixing ratio, for example, as shown in FIG. 6.

The molecular structural species A exemplified in FIG. 6 is a molecular structural species having a high degree of influence on the characteristic line (hereafter, first characteristic line) related to the in-cylinder oxygen concentration (that is, first parameter). In addition, the molecular structural species B is a molecular structural species having a high degree of influence on the characteristic line (hereafter, second characteristic line) relating to the in-cylinder temperature (that is, second parameter). The molecular structural species C is a molecular structural species having a high degree of influence on the characteristic line (that is, third characteristic line) relating to the third parameter. The molecular structural species A is mixed more, as a change in the ignition delay time TD appears more with respect to a change in the first parameter. In a similar manner, the molecular structural species B are mixed more, as a change in the ignition delay time TD appears more with respect to a change in the second parameter. The molecular structural species B is mixed more, as a change in the ignition delay time TD appears more with respect to a change in the third parameter. Therefore, the mixing ratio of the molecular structural species A, B, C can be estimated for each of the different fuels (1), (2) and (3).

Subsequently, the processing of a program to be executed by the combustion characteristic acquisition unit 81 will be described. The processing is executed each time a pilot injection is commanded.

First, the combustion characteristic acquisition unit 81 estimates the time point t3 of the combustion start based on the detection value of the in-cylinder pressure sensor 21 as described above, and calculates the ignition delay time TD related to the pilot injection. Subsequently, the combustion characteristic acquisition unit 81 stores the ignition delay time TD in association with the multiple parameters (for example, combustion conditions) in the memory 80b.

Specifically, a numerical range, in which the respective parameters can be, is divided into multiple regions in advance, and the combinations of regions of the multiple parameters are set in advance. For example, the ignition delay time TD(i) shown in FIG. 3 represents the ignition delay time TD acquired under the combination of the regions of P(i), T(i), O2(i), and Pc(i). Likewise, the ignition delay time TD(j) represents the ignition delay time TD acquired under the combination of the regions of P(j), T(j), O2(j), and Pc(j).

When it is highly likely that another fuel has been mixed with the fuel stored in the fuel tank due to refueling by a user, it is assumed that the mixing ratio of the molecular structural species has changed and an estimated value of the mixing amount is reset. For example, the estimated value of the mixing amount is reset when an increase in the remaining fuel level is detected by a sensor that detects the remaining fuel level in the fuel tank at the time of stopping the operation of the internal combustion engine 10.

The combustion characteristic acquisition unit 81 substitutes the ignition delay time TD into the determinant of FIG. 3 to calculate the mixing amount for each molecular structural species. The combustion characteristic acquisition unit 81 changes the number of columns of the matrix representing the constant according to the sampling number, that is, the number of rows of the matrix on the right side of the right member of the determinant. Alternatively, the combustion characteristic acquisition unit 81 substitutes a preset nominal value into the matrix of the ignition delay time TD with respect to the ignition delay time TD that has not been acquired. The combustion characteristic acquisition unit 81 calculates the mixing ratio for each molecular structural species based on the mixing amount, which is calculated in this manner for each molecular structural species.

As described above, the microcomputer 80a also functions as the injection control unit 83, the fuel pressure control unit 84, the EGR control unit 85, the supercharging pressure control unit 86, and the intake manifold temperature control unit 87. Those control units set target values on the basis of an engine speed, an engine load, an engine coolant temperature and the like and perform a feedback control so that a control target has a target value. Alternatively, those control units performs an open control according to contents corresponding to the target value.

The injection control unit 83 sets the pulse signal of FIG. 2 so that the injection start timing, the injection amount, and the injection stage number become the target values, thereby to control (hereafter, injection control) the injection start timing, the injection amount, and the injection stage number. The number of injection stages is the number of injections pertaining to the multistage injection described above. Specifically, the injection control unit 83 stores an ON time (that is, energization time) and a pulse ON rise timing (hereafter, energization start timing) of the pulse signal corresponding to the target value on a map in advance. The injection control unit 83 acquires the energization time and energization start timing corresponding to the target value from the map and sets a pulse signal.

In addition, the injection control unit 83 stores the output torque generated by the injection, emission state values such as the NOx amount and the PM amount in advance. In setting the target value based on the engine speed, the engine load and the like in next and subsequent injections, the injection control unit 83 corrects the target value based on the values stored as described above. In short, the injection control unit 83 corrects the target value so as to make a deviation between the actual output torque or emission state value, and the desired output torque or emission state value zero, and performs the feedback control.

The fuel pressure control unit 84 controls the operation of a metering valve that controls a flow rate of the fuel drawn into the fuel pump 15p. Specifically, the fuel pressure control unit 84 feedback controls the operation of the regulating valve, based on a difference between an actual common-rail pressure detected by the rail pressure sensor 23 and the target pressure Ptrg that is a target value. Then, the fuel pressure control unit 84 controls a discharge amount of the fuel pump 15p per unit time, and controls the actual common-rail pressure to be the target value. In this case, the fuel pressure control unit 84 executes a fuel pressure control.

The EGR control unit 85 sets a target value of the EGR amount based on the engine speed, the engine load, and the like. The EGR control unit 85 controls the EGR amount while controlling (EGR control) the valve opening degree of the EGR valve 17a based on the target value. The supercharging pressure control unit 86 sets a target value of the supercharging pressure based on the engine speed, the engine load, and the like. The supercharging pressure control unit 86 controls the supercharging pressure while controlling (supercharging pressure control) the operation of the supercharging pressure regulator 26 based on the above target value. The intake manifold temperature control unit 87 sets a target value of the intake manifold temperature based on the outside air temperature, the engine speed, the engine load, and the like. The intake manifold temperature control unit 87 controls the intake manifold temperature while controlling (intake manifold temperature control) the valve opening degree of the temperature control valve 17d based on the above target value.

The microcomputer 80a functions as the injection control unit 83 thereby to execute a main control processing that performs a control for the main injection. Herein, the main control processing will be described with reference to the flowchart of FIG. 7. The above process is repeatedly executed in a predetermined cycle during the operation period of the internal combustion engine 10.

Figure 7:
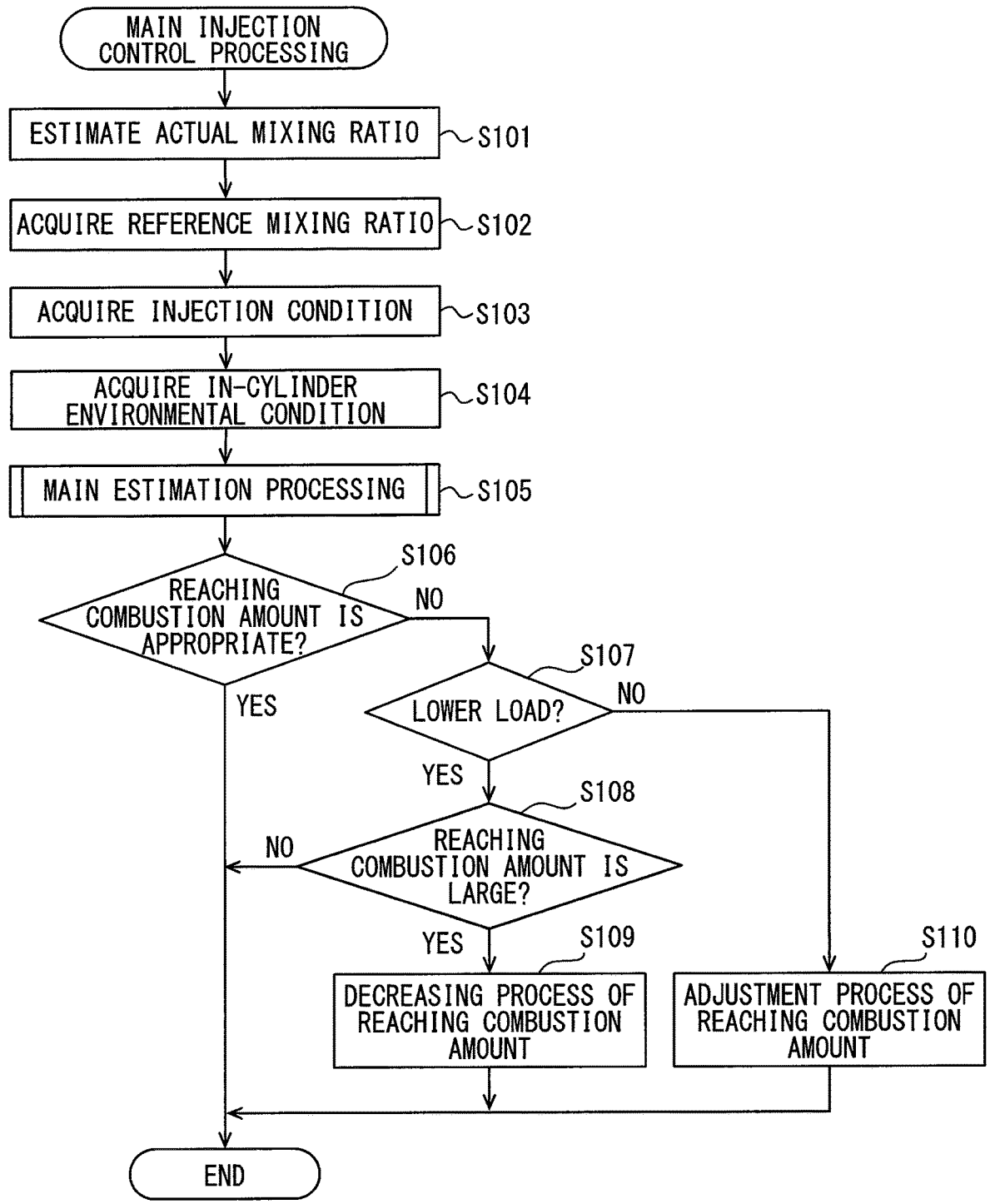
FIG. 7 is a flowchart showing a procedure of main control processing.

First, in step S101 of FIG. 7, the mixing ratio (hereafter, an actual mixing ratio) estimated with the mixing ratio estimation unit 82 is acquired. In other words, the mixing ratio for each molecular structural species shown on the left side of FIG. 3 is acquired. On the other hand, a reference value (hereafter, reference mixing ratio) of the mixing ratio for each molecular structural species is set in advance and stored in the memory 80b. Those reference mixing ratios are set in consideration of the fuel that is distributed in countries or regions where the vehicle device is used. Step S101 corresponds to a mixing acquisition unit. In step S102, the reference mixing ratio is read from the memory 80b and acquired.

In step S103, an injection condition on the main injection is acquired. Examples of the injection conditions include a rail pressure, which is a fuel pressure in the common rail 15c, a target injection amount, which is a target value of the injection amount, an energization period for the fuel injection valve 15, a needle lift amount of the fuel injection valve 15, and the like. The rail pressure is an injection pressure under the combustion condition.

At step S104, in-cylinder environmental conditions when the main injection is performed are acquired. Examples of the in-cylinder environmental conditions include the in-cylinder temperature, which is the temperature of the combustion chamber 11a, the in-cylinder oxygen concentration, which is the oxygen concentration of the combustion chamber 11a, the in-cylinder flow rate, which is the flow rate of the air-fuel mixture in the combustion chamber 11a, and a direction of an air flow of a mixture gas or the like. The in-cylinder flow rate and the direction of the air flow in the in-cylinder environmental conditions can be referred to as a state of the air flow in the combustion chamber 11a. The in-cylinder temperature is also included in the combustion conditions. Further, the in-cylinder oxygen concentration is acquired based on the intake oxygen concentration included in the combustion conditions. Step S104 corresponds to an air flow acquisition unit.

In step S105, main estimation processing is executed. The main estimation processing will be described referring to the flowchart of FIG. 8. The combustion of the fuel performed by the main injection is referred to as a main combustion, and a state of the main combustion is referred to as a main combustion state. Even in a case where a fuel has the same property (for example, the cetane number), when the mixing ratio of the molecular structural species contained in the fuel differs, the main combustion state differs.

Figure 8:
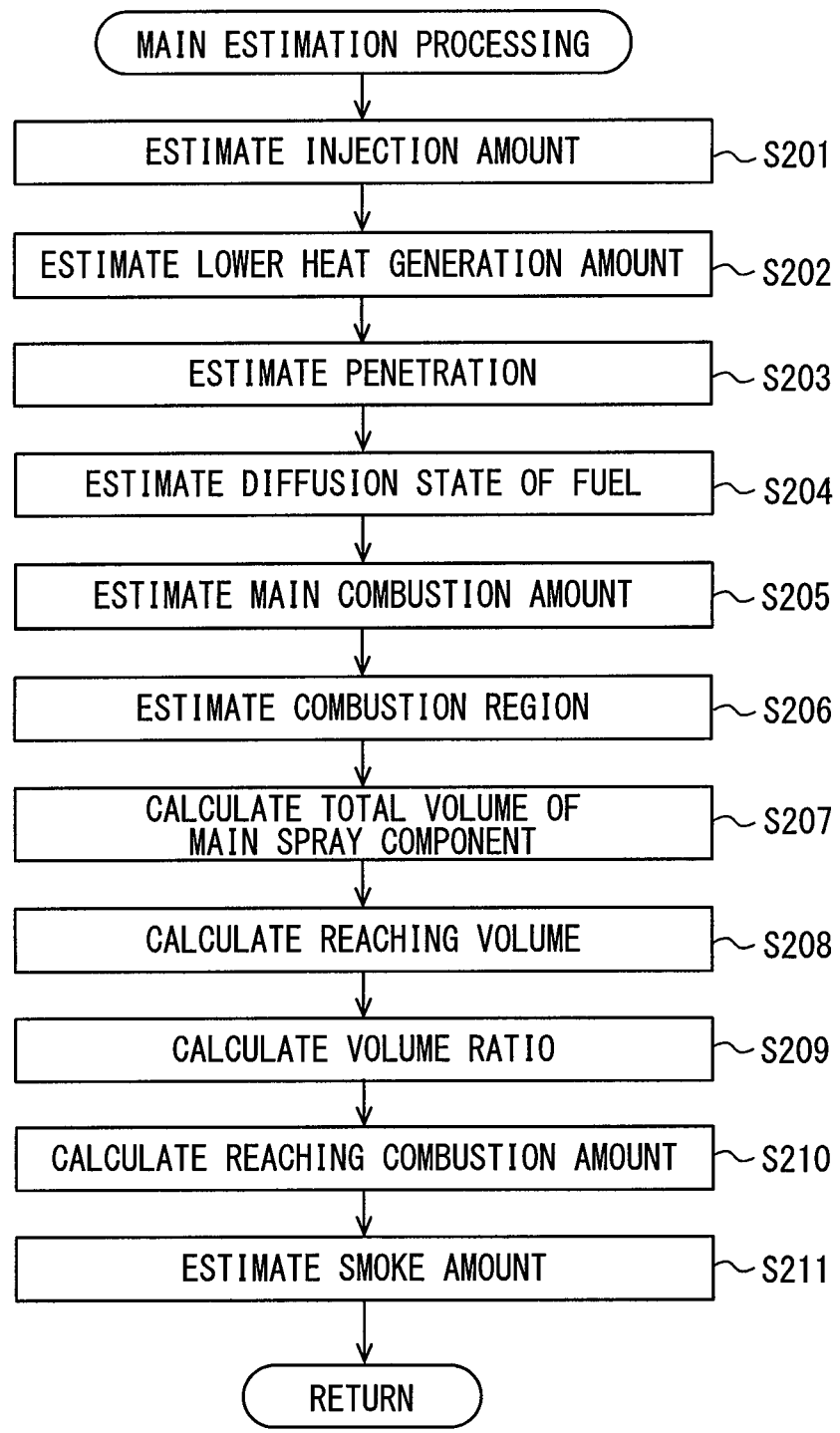
FIG. 8 is a flowchart showing a procedure of main estimation processing.

In FIG. 8, in steps S201 to S204, the injection state of the main injection is estimated according to the actual mixing ratio of the molecular structural species acquired in step S101. The injection parameter, which represents the injection state of the main injection, includes four parameters that are the injection amount, the lower heat generation amount, the penetration, and the diffusion state. For the reference fuel having the reference mixing ratio, the values of the respective injection parameters corresponding to the in-cylinder environment relating to the main injection are acquired in advance by conducting an experiment or the like, and those acquired data are stored in the memory 80b as reference data. For the actual fuel having the actual mixing ratio, the value of each injection parameter relating to the main injection is estimated with comparison with the reference data.

Figure 9:
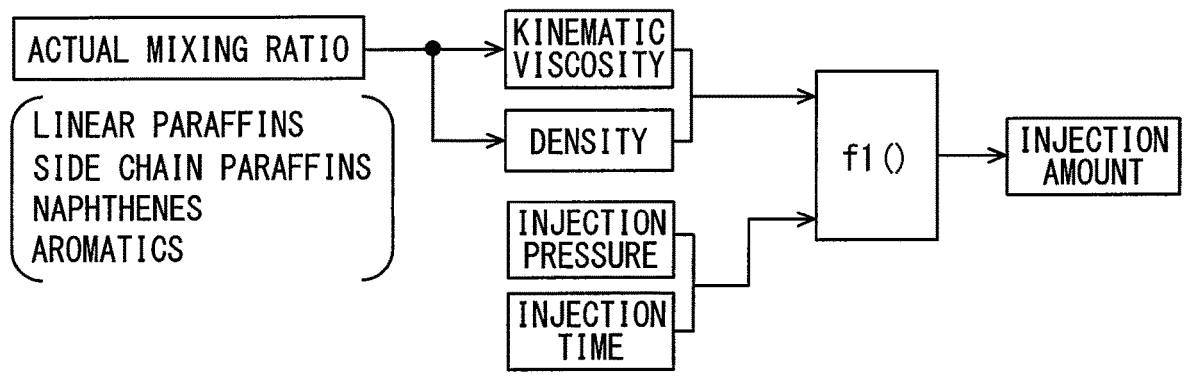
FIG. 9 is a diagram illustrating estimation of an injection amount as an injection parameter.

In step S201, the injection amount of the main injection is estimated based on the actual mixing ratio. In this example, as shown in FIG. 9, a kinematic viscosity and a density among the general properties of the fuel are estimated on the basis of the actual mixing ratio, and the injection amount is estimated with the use of a predetermined function f1( ) for the kinematic viscosity and the density as well as the injection pressure and the injection period of the injection conditions. In that case, the kinematic viscosity and the density are parts of the fuel characteristics, which are chemically affected, and the injection pressure and the injection period are parts of the use conditions and the environmental conditions, which are physically affected. Further, in the estimation of the injection amount, an estimation model such as a multiple regression model or a map may be used in place of the function f1( ). Furthermore, the pulse on period Tq may be used as the injection period. Step S201 corresponds to an injection amount estimation unit.

Figure 10:
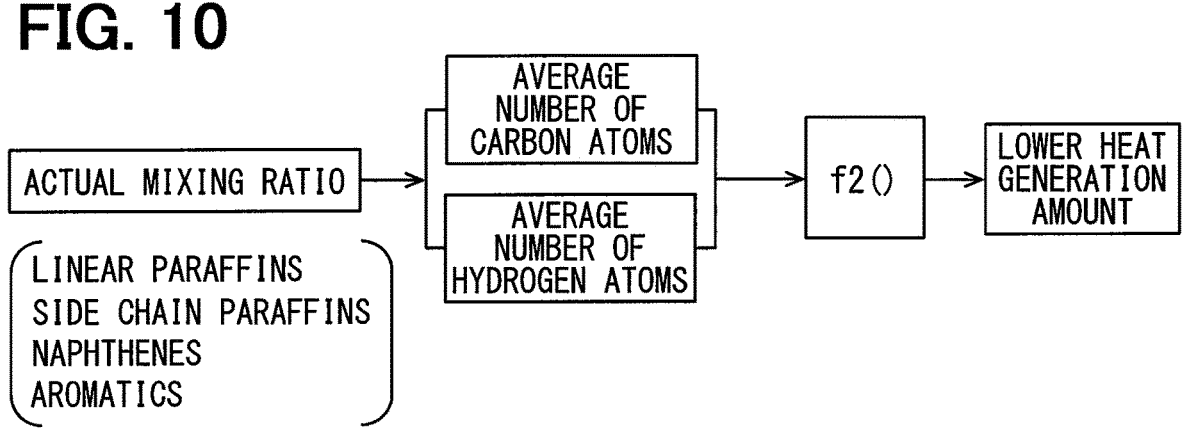
FIG. 10 is a diagram illustrating estimation of a lower heat generation amount as the injection parameter.

In step S202, the lower heat generation amount of the fuel is estimated based on the actual mixing ratio. In this example, as shown in FIG. 10, an average number of carbon atoms and an average number of hydrogen atoms of the fuel are estimated based on an actual mixing ratio, and the lower heat generation amount is estimated with the use of a predetermined function f2( ) for the average number of carbon atoms and the average number of hydrogen atoms. In this case, the average number of carbon atoms and the average number of hydrogen atoms are determined according to the fuel characteristics which are chemically affected. When the lower heat generation amount is estimated, an estimation model, a map, or the like may be used instead of the function f2( ). Incidentally, step S202 corresponds to a heat generation amount estimation unit.

In step S203, the penetration of the fuel injected by the main injection is estimated according to the actual mixing ratio. The penetration is a penetration force indicating a force by which the fuel injected from the fuel injection valve 15 goes straight through the combustion chamber 11a. The penetration of the injected fuel tends to decrease more, as an evaporation amount in the combustion chamber 11a increases more. Therefore, by estimating the volatility of the fuel based on the multiple distillation characteristics, the penetration of the fuel is estimated. Step S203 corresponds to a penetration force estimation unit.

Figure 11:
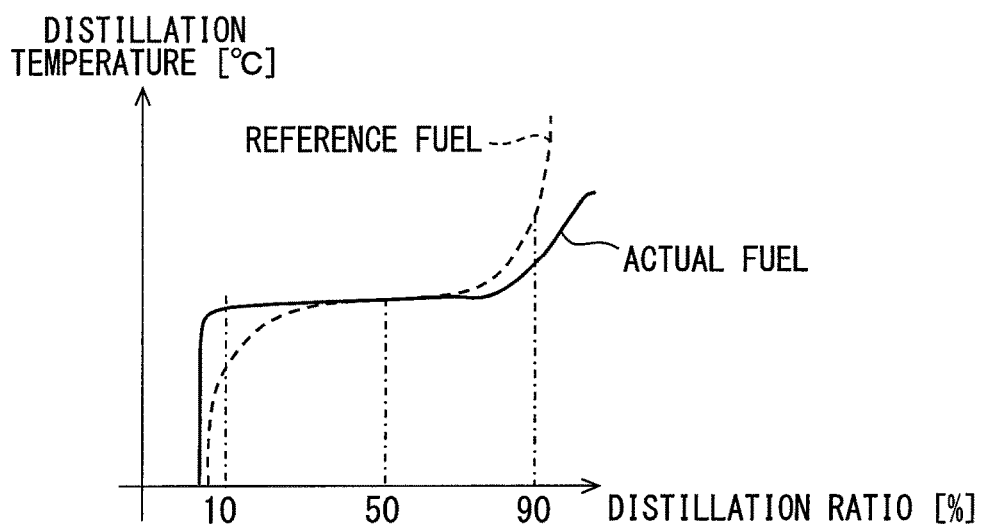
FIG. 11 is a diagram illustrating distillation characteristics.

As shown in FIG. 11, in the comparison between a reference fuel at a reference mixing ratio and an actual fuel at an actual mixing ratio, even in a case where the distillation characteristics T50, at which evaporating by 50%, are the same between the reference fuel and the actual fuel, the distillation characteristics T10 and T90 may be different between the reference fuel and the actual fuel. In that case, by estimating the penetration of the fuel based on the multiple distillation characteristics, the estimation precision can be increased.

In the fuel diffused in the combustion chamber 11a by being injected, a momentum becomes larger, as a mass of particles is larger, and the penetration tends to increase. In this case, the fuel having a higher kinematic viscosity and being less likely to be atomized tends to have a larger density, and the mass of the particles tends to increase. Further, the particles lose their mass more, as the volatility is higher, and the momentum becomes smaller. For example, a fuel at a low temperature from an initial boiling point of the distillation characteristics to a temperature T50 relatively trends to vaporize, and the penetration tends to be small.

In step S203, as shown in FIG. 12, the penetration is estimated based on the fuel characteristics including the density, the kinematic viscosity, and the multiple distillation characteristics, the in-cylinder environment including the in-cylinder temperature and the in-cylinder flow rate, and the injection amount estimated in step S201. The penetration is influenced by the in-cylinder environmental conditions and the injection conditions, and can be estimated with a mathematical formula as shown in FIG. 13. In the formula, penetration P1, P2, P3 . . . according to the in-cylinder environmental conditions and the injection conditions are estimated based on a predetermined constant b and the fuel characteristics such as the kinematic viscosity. The constant b is, for example, a matrix having numerical values b00 . . . bXY.

The distillation characteristics are estimated based on the actual mixing ratio contained in the fuel. For that reason, the fuel characteristics also include a factor of the actual mixing ratio in addition to general characteristics such as the density, the kinematic viscosity and the distillation characteristics.

Returning to FIG. 8, in step S204, the diffusion state of the fuel injected by the main injection is estimated according to the actual mixing ratio. The diffusion state is a degree of diffusion indicating how much the injected fuel diffuses. The injected fuel is likely to diffuse, as the evaporation amount in the combustion chamber 11a further increases. Therefore, as with the penetration, the volatility of the combustion is estimated based on the multiple distillation characteristics to estimate the diffusion state of the fuel. Incidentally, step S204 corresponds to a diffusion estimation unit.

In step S204, as shown in FIG. 14, the diffusion state is estimated based on the fuel characteristics including the density, the kinematic viscosity, and the multiple distillation characteristics, the in-cylinder environment including the in-cylinder temperature and the in-cylinder flow rate, and the injection amount estimated in step S201. The diffusion state is influenced by the in-cylinder environmental conditions and the injection conditions, and can be estimated with a mathematical formula as shown in FIG. 15. In the formula, diffusion states D1, D2, D3 . . . according to the in-cylinder environmental conditions and the injection conditions are estimated based on a predetermined constant c and the fuel characteristics such as the kinematic viscosity. The constant c is, for example, a matrix having numerical values c00 . . . cXY.

The diffusion state can also be calculated with the use of a well-known mathematical formula showing the momentum theory of spraying.

In steps S205 and S206, the main combustion state is estimated with the use of the injection parameters estimated in steps S201 to S204. The combustion parameters indicating the combustion state include two parameters including a combustion amount and a combustion region. In the reference fuel, the values of the respective combustion parameters corresponding to the in-cylinder environment relating to the main injection are acquired in advance by conducting an experiment or the like, and as with the injection parameters, those acquired data are stored in the memory 80b as the reference data. The actual fuel is compared with reference data relating to the main injection to estimate a value of each combustion parameter.

In step S205, the amount of combustion caused by the main injection is estimated. In the estimation of the combustion amount, all of the four injection parameters including the injection amount, the lower heat generation amount, the penetration, and the diffusion state are used. For example, the combustion amount is calculated with the use of a mathematical formula shown in FIG. 16. In the formula, Qburn represents the combustion amount, α represents the combustion rate, ρ×Qinj represents the injection amount, which is estimated in step S201, and A represents the lower heat generation amount, which is estimated in step S202. As shown in FIG. 17, the combustion rate α is estimated with the use of a predetermined function f3( ) for the penetration estimated in step S203 and the diffusion state estimated in step S204. In addition, a spray volume of the main injection is also estimated with the use of the penetration and the diffusion state. Step S205 corresponds to a combustion amount estimation unit. The combustion amount of the main combustion is referred to as a main combustion amount.

In step S206, the combustion region caused by the main injection is estimated. The combustion region corresponds to a position or a region where the combustion caused by the fuel. Estimation of the combustion region uses three of the four injection parameters including the injection amount, the penetration, and the diffusion state. For example, the combustion region is estimated with the use of predetermined functions, maps, models, or the like on the injection amount, the penetration, and the diffusion state. Step S206 corresponds to a region estimation unit. The combustion region of the main combustion is referred to as a main combustion region.

In step S206, the combustion region is estimated based on the in-cylinder environmental conditions in addition of three injection parameters. The penetration and the diffusion state of the main injection are likely to be influenced by a state of the air flow in the in-cylinder environmental conditions. In other words, the combustion region is also likely to be influenced by the state of the air flow of the combustion chamber 11a.

In step S207, a total volume of a main spray component F caused by the main injection is calculated. When the fuel injected by the main injection diffuses into a spray, a diffusion region of the spray is referred to as the main spray component F. At the timing of executing the main injection, it is unlikely that the ignition delay is generated due to a condition that the in-cylinder temperature becomes sufficiently high. In this case, substantially the entirety of the main spray component F defines the combustion region of the main combustion, and so the combustion region is estimated by estimating the volume and the position of the main spray component F. Step S207 corresponds to a total estimation unit.

Figure 18:
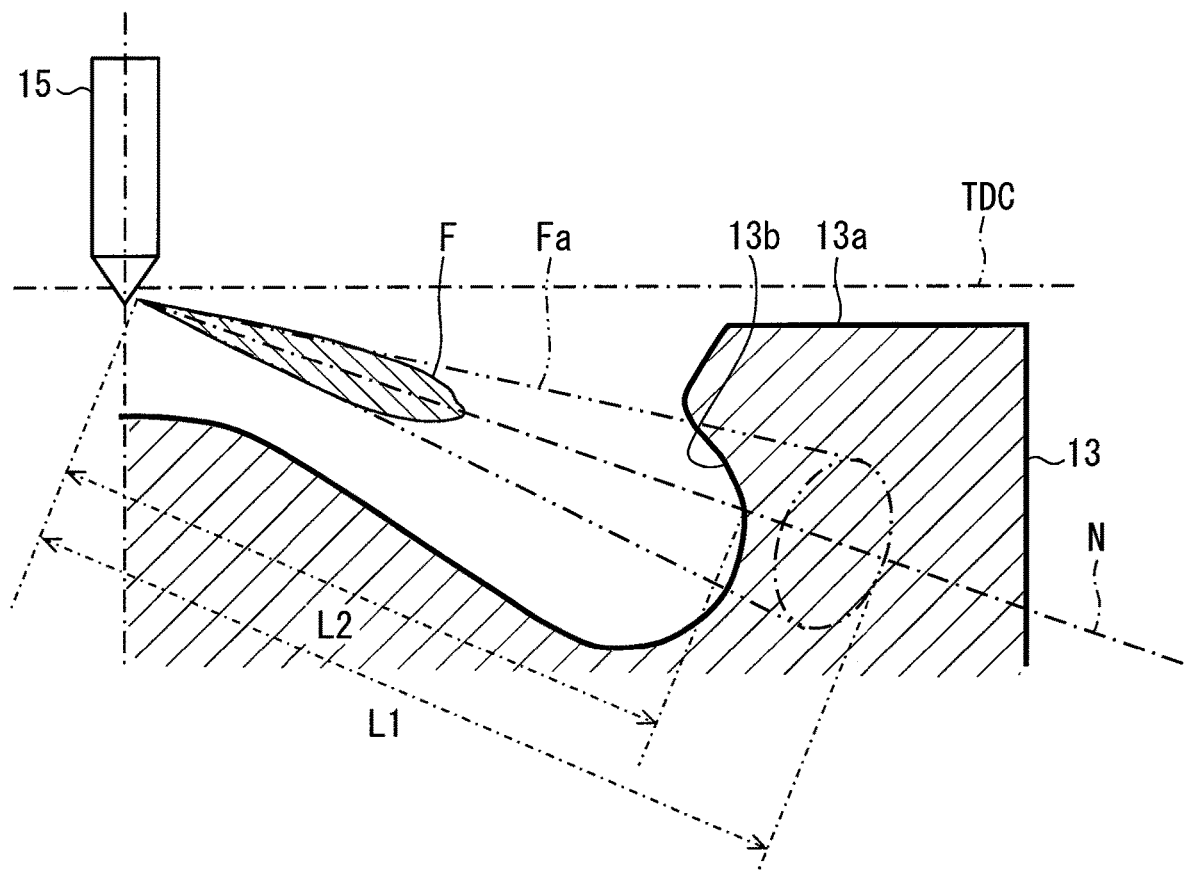
FIG. 18 is a diagram showing a main spray component and a total spray component.

As shown in FIG. 18, a cavity 13b that is a depression part is on an upper end surface 13a of the piston 13. The combustion chamber 11a has the inner space of the cavity 13b. The fuel injection valve 15 is located at the center position of the piston 13 in the width direction. An inner peripheral surface of the combustion chamber 11a includes an inner peripheral surface of the cavity 13b, the upper end surface 13a of the piston 13, an inner peripheral surface of the cylinder, and the like.

The fuel injected from the fuel injection valve 15 travels along an injection axis N that is a center axis of the injection hole of the fuel injection valve 15. In this case, the main spray component F extends along the injection axis N. At the timing where the main injection is executed, the injection axis N intersects the inner peripheral surface of the cavity 13b, and the main spray component F travels towards the inner peripheral surface of the cavity 13b. Right after the main injection is executed, as solid line show in FIG. 18, the main spray component F does not reach the inner peripheral surface of the cavity 13b. Then, the main spray component F travels to reach the inner peripheral surface of the cavity 13b.

Figure 19:
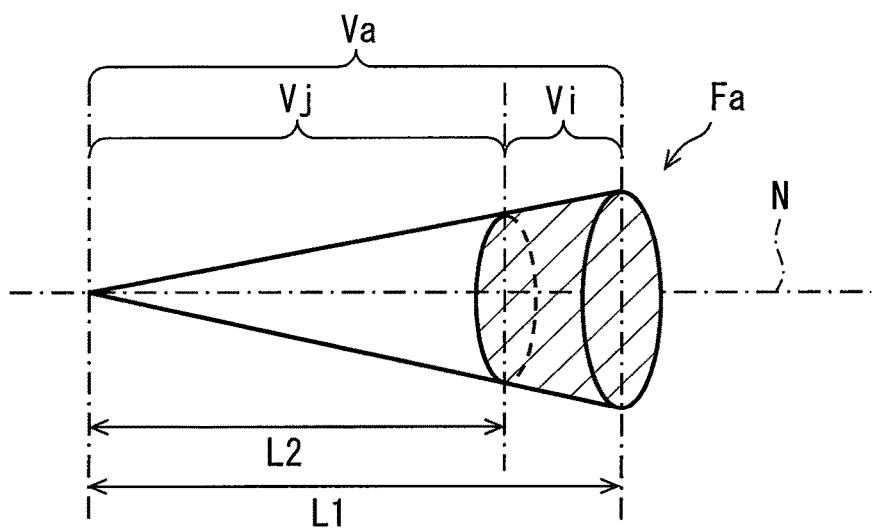
FIG. 19 is a diagram illustrating a total volume and a reaching volume of the total spray component.

When it is assumed that the cavity 13b does not exist, as two-dot chain lines shown in FIG. 18, the main spray component F extends to a position farther than the inner peripheral surface of the cavity 13b. In this case, the main spray component F is referred to as a total spray component Fa. A length dimension L1 of the total spray component Fa is greater than a separation distance L2 between the injection hole and the inner peripheral surface of the cavity 13b on the injection axis N. As shown in FIG. 19, a volume of the total spray component Fa is a total volume Va. In step S207 of FIG. 8, the total volume Va is calculated.

Return to FIG. 8, in step S208, a reaching volume Vi of the total volume Va of the total spray component Fa is calculated. As shown in FIG. 19, the total volume Va of the total spray component Fa includes the reaching volume Vi disappeared when the fuel of the main injection reaches the inner peripheral surface of the cavity 13b, and a substantial volume Vj that exists in the combustion chamber 11a where the fuel does not reach the inner peripheral surface of the cavity 13b. In step S208, the substantial volume Vj is calculated, and a difference between the total volume Va and the substantial volume Vj is calculated as the reaching volume Vi. Step S208 corresponds to a reaching volume estimation unit.

In step S209, a ratio between the total volume Va and the reaching volume Vi is calculated as a reaching ratio. In this case, the reaching ratio is a ratio of the reaching volume Vi to the total volume Va.

In step S210, a reaching combustion amount is calculated by using the main combustion amount estimated in step S205 and the reaching ratio estimated in step S209. In the main combustion amount, the combustion amount distributed to the inner peripheral surface of the cavity 13b by the main injection is the reaching combustion amount. The reaching combustion amount is calculated by using a following formula (1). In formula (1), Qi represents the reaching combustion amount, and Qinj represents the main combustion amount. Step S210 corresponds to a reaching combustion estimation unit.

$$Qi = Qinj \times Vi/Va \quad (1)$$

Figure 20:
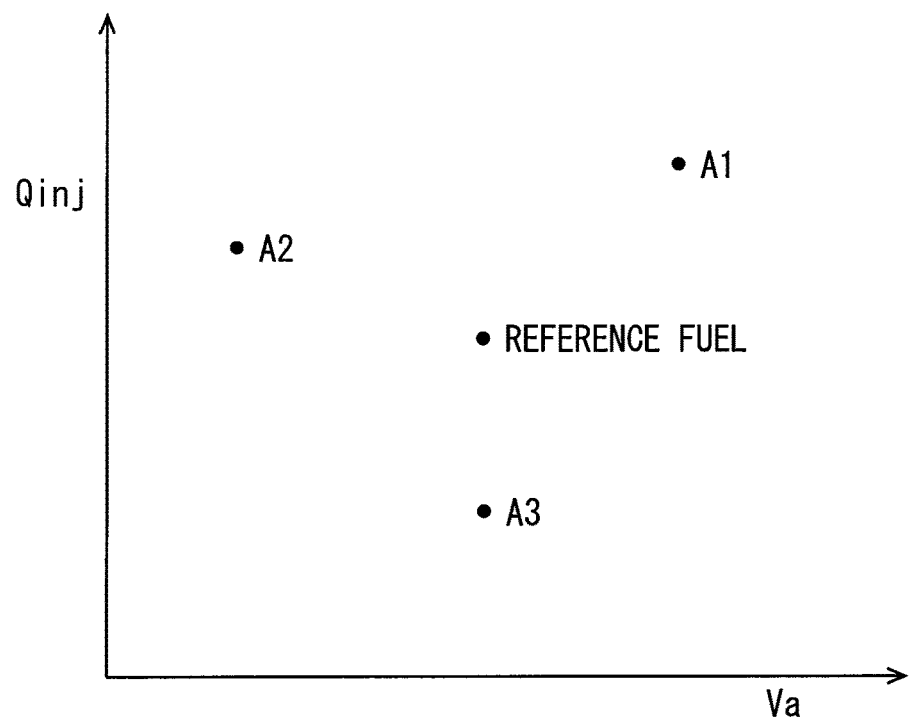
FIG. 20 is a diagram showing multiple fuels for a main combustion amount and the total volume.
Figure 21:
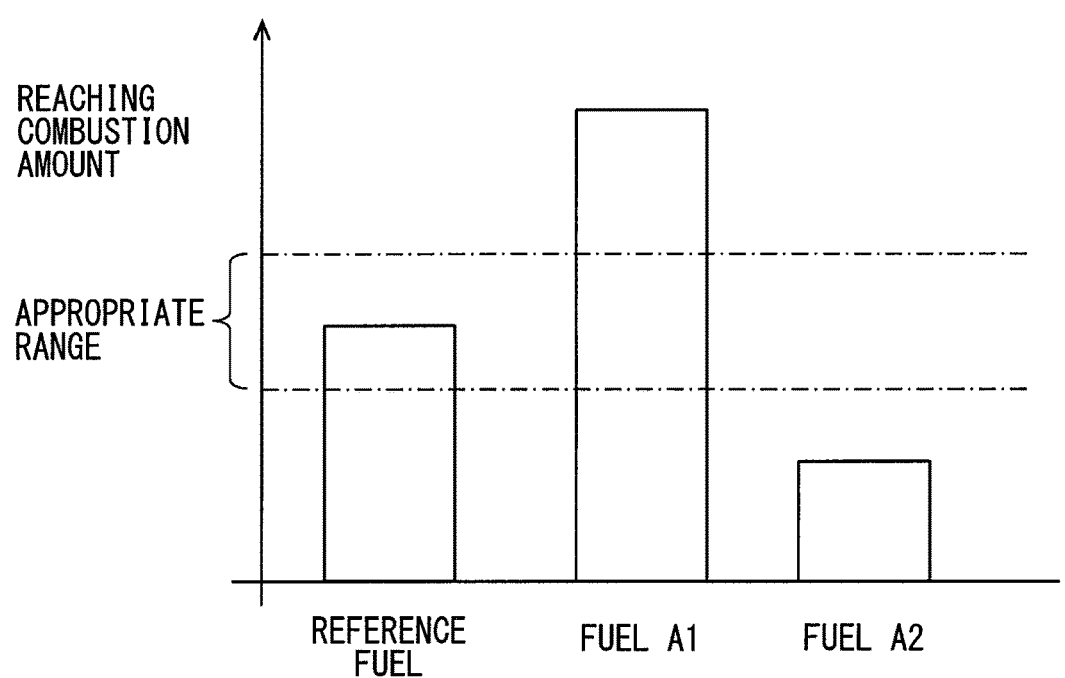
FIG. 21 is a diagram showing multiple fuels for a reaching combustion amount.

Since the main combustion amount Qinj and the total volume Va depends on the actual mixing ratio, it is highly possible that the reaching combustion Qi differs for each fuel even though the injection condition and the in-cylinder environmental conditions are identical. For example, as shown in FIG. 20, the main combustion amount Qinj and the total volume Va are appropriate values for the reference fuel. As shown in FIG. 21, the reaching combustion amount Qi is also in an appropriate range.

In contrast, as shown in FIG. 20, when both the main combustion amount Qinj and the total volume Va are relatively large, it is likely that the reaching combustion amount Qi becomes large for a fuel A1. A magnitude relation between the reaching combustion amounts Qi in a fuel A2 where the main combustion amount Qinj is relatively large and the total volume Va is relatively small and in a fuel A3 where the main combustion amount Qinj is relatively small and the total volume Va is relatively large is unknown. It is possible that the reaching combustion amounts Qi are substantially equal to each other for the fuels A2 and A3.

However, as shown in FIG. 21, when the reaching combustion amount Qi of the fuel A1 exceeds the appropriate range while the main combustion amount Qinj and the total volume Va are large, a heat amount distributed to the inner peripheral surface of the combustion chamber 11a becomes excessively large. A cooling loss that is a heat transmitted to a coolant that cools the cylinder block 11, the cylinder head 12, the piston 13, and the like become excessively large, and it is likely that the consumption of the internal combustion engine 10 decreases. When the degree of the diffusion of the fuel A1 increases, it is likely that the generation amount of the smoke decreases.

When the reaching combustion amount Qi does not reach the appropriate range for the fuel A2 where the main combustion amount Qinj is sufficiently large while the total volume Va is excessively small, the heat amount distributed to the inner peripheral surface of the combustion chamber 11a is small, and the cooling loss can be restricted to a remarkably small value. When the degree of the diffusion of the fuel A2 decreases, it is likely that the generation amount of the smoke increases.

Not the entire reaching combustion amount is transmitted to an exterior of the combustion chamber 11a as the cooling loss. The heat discharged in the combustion chamber 11a among the heat distributed to the inner peripheral surface of the combustion chamber 11a by the reaching combustion amount is used as an energy for activating the piston 13. In this case, the combustion amount among the reaching combustion amount disappeared as the cooling loss varies according to the injection condition, the in-cylinder environment, the coolant temperature, and the like. The reaching combustion amount can be referred to as an index for estimating the cooling loss which is a cooling index.

Return to FIG. 8, in step S211, the smoke amount existing after the main combustion is estimated. Estimation of the smoke amount uses the injection amount of the main injection, the lower heat generation amount, the penetration, the diffusion state, and the combustion region of the main combustion. For example, the combustion region is estimated with the use of predetermined functions, maps, models, or the like on the main combustion region. The smoke amount varies according to a using rate of the air in the main combustion. The combustion region influences the using rate of the air in the main combustion. For example, when the fuel of the main injection is injected appropriately to a spray, the using rate of the air also becomes appropriate, and it is unlikely that the smoke amount increases. In contrast, when the fuel is unlikely to diffuse while the spray is inappropriate, the using rate of the air decreases, and it is likely that the smoke amount increases. Thus, the smoke amount can be estimated based on the combustion region of the main combustion.

Return to FIG. 7, after the main estimation processing, the process proceeds to step S106, it is determined whether the reaching combustion amount is appropriate or not. Herein, data of the reaching combustion amount according to an in-cylinder environment is beforehand acquired for the reference fuel through an experiment or the like, and the data is stored in the memory 80b. In this case, the reaching combustion amount of the reference fuel is read from the memory 80b, and a "deviation" between the reaching combustion amount of the reference fuel and the reaching combustion amount of the actual fuel is calculated as a difference. Thus, it is determined whether the difference is smaller than a reference amount that is previously set or not. The difference in this case is an absolute value of the difference between the reaching combustion amount of the reference fuel and the reaching combustion amount of the actual fuel. When the difference is not smaller than the reference amount, it is determined that the reaching combustion amount is not appropriate, and the process proceeds to step S107.

In step S107, it is determined whether the operation state of the internal combustion engine 10 is a lower load state or not. In the lower load state, the ignition delay relating to the pilot injection and the main injection is large, and the injection amounts of the fuel in the pilot injection and the main injection are small. Thus, it is assumed that the smoke amount becomes small such that the smoke amount is not an issue. In a higher load state, since a flow of the air flow of the combustion chamber 11a becomes faster, the combustion gas generated by the combustion of the fuel is likely to introduce the air. In this case, the generation amount of the smoke is likely to decrease in response to a reoxidation of the combustion gas. Further, since the combustion gas moves together with the air flow along the inner peripheral surface of the combustion chamber 11a, the heat transmitted from the combustion gas to the inner peripheral surface becomes larger. Thus, the in-cylinder pressure is likely to decrease. As a result, a work amount of the internal combustion engine 10 decreases, and the fuel consumption is deteriorated.

When the internal combustion engine 10 is in the lower load state, the process proceeds to step S108, it is determined whether the reaching combustion amount of the actual fuel is greater than the reaching combustion amount of the reference fuel or not. When the reaching combustion amount of the actual fuel is greater than the reaching combustion amount of the reference fuel, the process proceeds to step S109.

In step S109, a decreasing process to decrease the reaching combustion amount of the actual fuel such that the difference of the reaching combustion amount becomes smaller than the reference amount is performed. As for the decreasing process, processing to decrease the injection amount, processing to increase the injection stages of the main injection, processing to decrease the injection pressure, and processing to adjust the injection timing toward an upper dead center TDC of the piston 13 can be taken.

In the decreasing process of the reaching combustion amount, various target values for decreasing the reaching combustion amount is set based on the actual mixing ratio. In this case, provisional target value is calculated, and then the target value is calculated by correcting the provisional target value by using the actual mixing ratio. For example, in the process of decreasing the injection amount, the provisional target value of the injection amount is calculated such that the difference of the reaching combustion amount is smaller than the reference combustion amount, and the provisional target value is corrected by using the actual mixing ratio. As a result, the issue that the injection amount is insufficient due to the actual mixing ratio although the process of decreasing the injection amount has been performed is restricted.

When the reaching combustion amount of the actual fuel is not greater than the reaching combustion amount of the reference fuel, the generation amount of the smoke is sufficiently small, and it is unnecessary to increase the reaching combustion amount of the actual fuel. Then, the present main injection control processing is terminated.

When the internal combustion engine 10 is not in the lower load state in step S107, that is, when the internal combustion engine 10 is in a medium load state or the higher load state, the process proceeds to step S110, and the adjustment process of the reaching combustion amount is performed such that the difference of the reaching combustion amount is smaller than the reference amount. In the medium load state or the higher load state, since the generation amount of the smoke and the cooling loss have a trade-off correlation, it is necessary to adjust the reaching combustion amount such that both the generation amount of the smoke and the cooling loss are in an allowable range.

In the adjustment process of the reaching combustion amount, an increasing process to increase the reaching combustion amount of the actual fuel, or the above decreasing process is performed. As for the increasing process, processing to increase the injection amount, processing to decrease the injection stages of the main injection, processing to decrease the injection pressure, and processing to adjust the injection timing toward the bottom dead center BDC of the piston 13 can be taken. In the increasing process, similar to the decreasing process, the various target values for increasing the reaching combustion amount are set based on the actual mixing ratio.

Steps S109 and S110 correspond to a combustion control unit.

In this example, the pilot injection performed while the in-cylinder temperature is rising, the main injection, the after-injection, and the post injection performed while the in-cylinder temperature is decreasing are performed in the stated order in one combustion cycle. The in-cylinder oxygen concentration is largest at a timing when the pilot injection is performed, decreases in the order of the main injection and the after-injection, and is smallest at a timing when the post injection is performed.

The in-cylinder temperature is lowest at a timing when the pilot injection is performed after intake starts, and rises to a sufficiently high temperature at a timing when the main injection and the after-injection are performed. Thereafter, the in-cylinder temperature decreases with an increase in a cylinder capacity in an expansion stroke of the piston, and becomes an intermediate temperature higher than the temperature at the timing when the pilot injection is performed, at the timing when the post injection is performed. In the combustion chamber 11a, for example, a low temperature range is set to 900K or lower, a medium temperature range is set to 900K to 1100K, and a high temperature range is set to 1100K or higher.

In one combustion cycle, chemical combustion is started by oxidation of combustible molecules such as ketone and aldehyde, with the generation of the OH radicals caused by the injection of the fuel. Examples of reactions for generating the OH radicals include a decomposition reaction, in which hydrogen peroxide H2O2 produced from inert HO2 radicals and alkene is decomposed into the OH radicals, and a chain branching reaction in which the generation and consumption of the OH radicals are repeated in a process where oxygen is given to hydrocarbons to produce combustible molecules. In the chain branching reaction, the generation amount and the consumption amount of the OH radicals are almost identical with each other. Estimation of the components contributing to the OH radicals is synonymous with the estimation of the generation amount of the combustible molecules.

Each molecular structural species of the fuel contains a produced molecule that is likely to produce the OH radicals in a process of a chain branching reaction and an inhibitor molecule that is unlikely to produce the OH radicals. The produced molecules include linear paraffins, and inhibitor molecules include aromatics. In the fuel, in not only the chain branching reaction but also any reactions, the ease of ignition varies depending on the density distribution between the produced molecule and the inhibitor molecule. However, when the decomposition of H2O2 is excessive in the high temperature range, the ignition timing varies depending on the generation state of the OH radicals and fluid turbulence inside and outside the spray. The density distribution between the produced molecule and the inhibitor molecule affects the generation position of the OH radical distribution produced by the chain branching reaction along a time series, and the mode of occurrence of the chain branching reaction is correlated with the fuel component.

Figure 22:
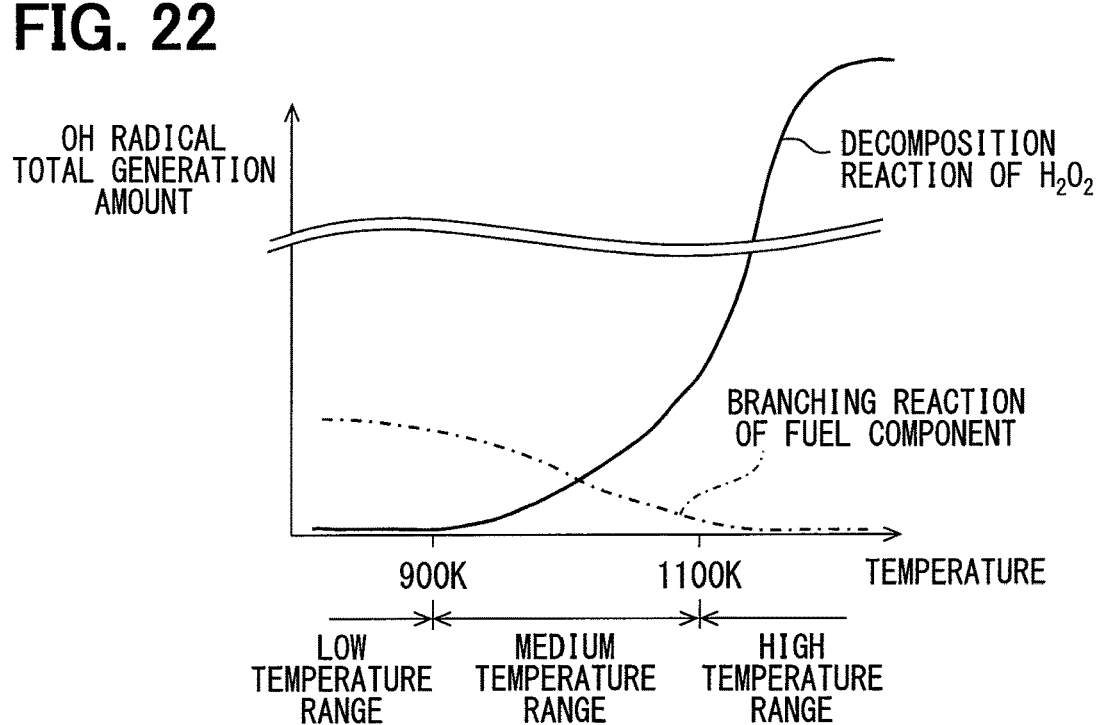
FIG. 22 is a diagram illustrating a generation amount of OH radicals.

Ease of ignition caused by the injection of the fuel varies depending on which temperature range, to which the in-cylinder temperature belongs at that time. As shown in FIG. 22, in the low temperature range where the in-cylinder temperature is 900K or lower, H2O2 is hardly decomposed, and the generation amount of the OH radical caused by the decomposition reaction of H2O2 is very small. On the other hand, among the fuel components, the chain branching reactions caused by the components capable of extracting hydrogen by intramolecular isomerization and having a structure with a small strain energy are likely to occur, and the generation amount of the OH radicals involved in the chain branching reaction is relatively increased. In that case, a large number of produced molecules tend to cause the chain branching reaction, and the decomposition reaction of H2O2 hardly occurs.

To this issue, the inventors have acquired knowledge that the degree of dependence of the ignition timing on the fuel component is high in the low temperature range which is the temperature range where the pilot injection is performed. In this case, as compared with a case, in which H2O2 is forcibly decomposed into combustible molecules such as ketone and aldehyde with 1 to 3 carbon atoms (C1 to C3) due to the OH radical production and 13 cleavage accompanying the decomposition of $H_2O_2$ at the high temperature to perform ignition, the ignition delay tends to occur depending on the actual mixing ratio.

As the in-cylinder temperature rises from the low temperature range, the amount of OH radicals generated by the chain branching reaction gradually decreases, and the amount of OH radicals produced by the decomposition reaction of H2O2 abruptly increases.

For example, in the medium temperature range where the in-cylinder temperature is 900K to 1100K, although H2O2 tends to be decomposed, the amount of OH radicals generated by the decomposition reaction of H2O2 does not increase sharply even though the temperature rises. In that case, the amount of OH radicals produced by the decomposition reaction of H2O2 is larger than the OH radicals generated by the chain branching reaction by the fuel component. Before a structure with small strain energy causing the chain branching reaction is formed, the number of molecules having a number of carbon atoms of 1 to 3 increases, and the chain branching reaction gradually decreases.

To this issue, the present inventors have acquired knowledge that an ignition delay, which depends on molecules produced as a fuel component causing the chain branching reaction, and an ignition delay, which is caused by the decomposition reaction of H2O2 having no sensitivity in a fuel component such as the produced molecule, are required to be taken into consideration for the ignition timing in the medium temperature range which is a temperature range where the post injection is performed. For that reason, in the medium temperature range, the dependence of the ignition timing on the fuel component is lower than that in the low temperature range where the pilot injection is performed, and the post injection is less likely to cause the ignition delay than the pilot injection depending on the actual mixing ratio.

Also, in a high temperature range where the in-cylinder temperature is 1100K or higher, H2O2 is likely to decompose, and the amount of OH radicals generated by the decomposition reaction of H2O2 abruptly increases as the temperature rises. On the other hand, the number of molecules causing the chain branching reaction by the fuel component decreases, and the amount of OH radicals generated by the chain branching reaction is very small. To this issue, the present inventors have acquired knowledge that the ignition timing is hardly influenced by the chemical combustion of the fuel in the high temperature range where the main injection and the after-injection are performed. For that reason, depending on the actual mixing ratio, the main injection and the after-injection are less likely to cause the ignition delay than the post injection.

As follows, operational effects of the first embodiment described above will be described.

According to the first embodiment, since both the main combustion amount of the main combustion and the combustion region are estimated based on the actual mixing ratio, the estimation precision of the reaching combustion amount is improved. In this case, since the heat distributed by the reaching combustion amount to the inner peripheral surface of the combustion chamber 11a becomes the heat distributed to the output of the internal combustion engine 10 or the heat disappeared as the cooling loss, the estimation precision of the cooling loss is also improved. Even when the molecular structural species contained in the actual fuel differs or the mixing ratio of the molecular structural species differs, the cooling loss caused by the main injection can be managed appropriately.

According to the first embodiment, since the cooling loss is managed based on the reaching combustion amount after the reaching combustion amount is estimated based on the main combustion amount and the combustion region, the management precision of the cooling loss can be improved comparing a configuration where the cooling loss is directly managed from the main combustion amount and the combustion region.

According to the first embodiment, since the reaching combustion amount is calculated by assuming the total volume Va and the reaching volume Vi for the main spray component F, a calculation of the ratio of the reaching combustion amount to the main combustion amount can be simplified by using the total volume Va and the reaching volume Vi. Further, since the total volume Va and the reaching volume Vi correspond to the combustion region estimated by using the actual mixing ratio, the calculation precisions of the total volume Va and the reaching volume Vi is improved according to the actual mixing ratio. Thus, it can be achieved in a configuration that the calculation precision of the reaching combustion amount is improved.

According to the first embodiment, since the state of the air flow of the combustion chamber 11a is used in the estimation of the combustion region, the state of the air flow of the combustion chamber 11a is reflected in the reaching combustion amount. Thus, even though the total volume Va or the reaching volume Vi of the main spray component F changes to increase or decrease according to the air flow of the combustion chamber 11a, the cooling can be managed by considering the change.

According to the first embodiment, the combustion state of the main combustion is estimated by using four injection parameters including the injection amount, the lower heat generation amount, the penetration, and the diffusion state, for the main injection. In this case, for example, as compared with the configuration where the main combustion state is directly estimated with the use of the function, the map, or the model for the actual mixing ratio, the degree of dependence of the estimation result on the functions, the maps, and the models can be lowered, and the difficulty of creating the functions, the maps and the models can be lowered. Thus, the estimation precision of the main combustion state can be improved.

According to the first embodiment, since the adjustment processing of the reaching combustion amount is performed based on the actual mixing ratio, it can be restricted that the deviation of the reaching combustion amount is not smaller than the reference amount although the adjustment process is performed. For that reason, with the use of the actual mixing ratio, high estimation precision can be effectively leveraged for controlling the combustion system in a configuration in which the estimation precision of the combustion amount and the combustion region is enhanced.

Second Embodiment

According to the first embodiment, the total volume Va and the reaching volume Vi of the main spray component are calculated based on the combustion region that is the combustion parameter. According to a second embodiment, the total volume Va and the reaching volume Vi are calculated based on the penetration that is the injection parameter. Main control processing of the present embodiment will be described referring to the flowchart of FIG. 23.

Figure 23:
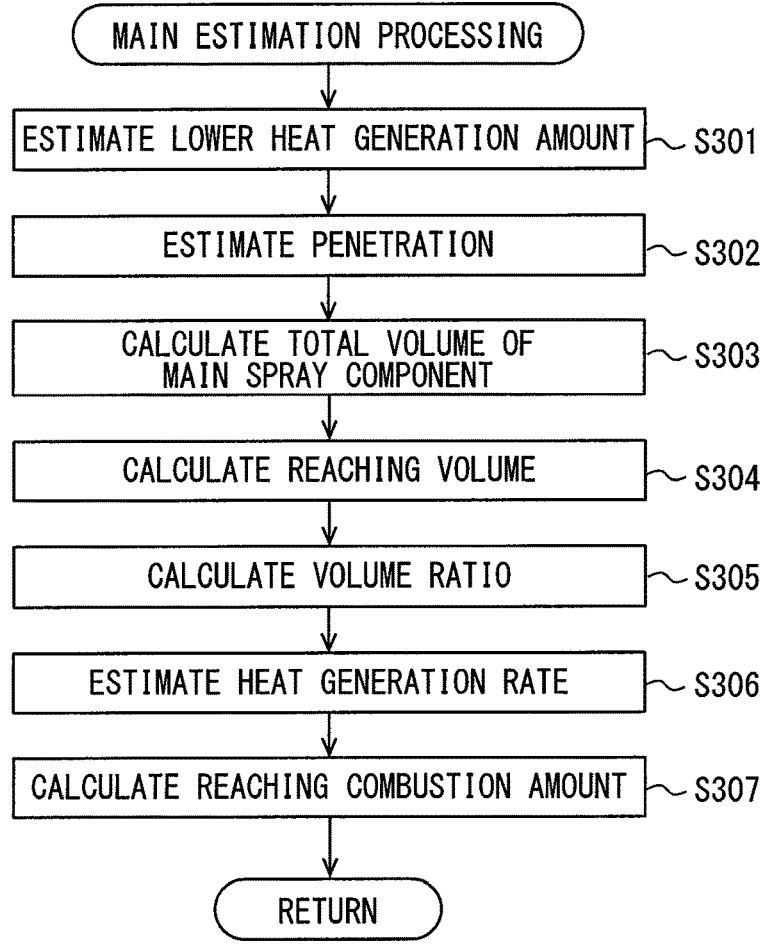
FIG. 23 is a flowchart showing a procedure of main estimation processing according to a second embodiment.

In FIG. 23, in steps S301 to S302, the same processing as steps S202 to S203 of the first embodiment is performed. Step S301 corresponds to the heat generation amount estimation unit, and step S302 corresponds to the combustion amount estimation unit.

In step S303, the total volume Va of the main spray component F is calculated based on the penetration estimated in step S302. Since the penetration is estimated based on the actual mixing ratio, the estimation of the total volume Va indirectly uses the actual mixing ratio. Values of the total volumes Va according to the penetration of each injection condition or each in-cylinder environment condition are beforehand acquired for the reference fuel through an experiment or the like, and the acquired data is stored in the memory 80b. The penetration of the actual fuel and the penetration of the reference fuel are compared with each other. The total volume Va for the actual fuel is calculated by a reference that is the total volume Va for the reference fuel.

In steps S304 and S305, the same processing as steps S208 and S209 in the first embodiment is performed. By using the total volume Va calculated in step S303, the same processing as that in the first embodiment may be used to calculate the reaching volume Vi and the volume ratio.

In step S306, the heat generation ratio caused by the fuel of the main injection is estimated based on the lower heat generation amount and the penetration. The heat generation rate is a heat amount generated per unit time. The main combustion amount can be calculated by integrating the heat generation rate from a combustion start of the fuel injected by the main injection to a combustion end of the fuel injected by the main injection.

In step S307, the reaching combustion amount is calculated by using the heat generation rate. As shown in a lower part of FIG. 24, when it is assumed that the main spray component F travels to exceed the inner peripheral surface of the combustion chamber 11a, the tip end part of the main spray component F reaches the inner peripheral surface of the combustion chamber 11a at a timing ta that the length dimension of the main spray component F reaches L2. As shown in an upper part of the FIG. 24, the combustion of the fuel caused by the main injection has already occurred at the timing ta, and the combustion ends at the timing tb. A period between the timing ta and the timing tb is referred to as a combustion period Tab. The heat generation rate in the combustion period Tab is referred to as dQi. The combustion amount Qab in the combustion period Tab can be calculated by integrating the heat generation rate dQi for the combustion period Tab. The reaching combustion amount Qi is calculated based on the combustion amount Qab and the volume ratio.

Figures 24, 25:
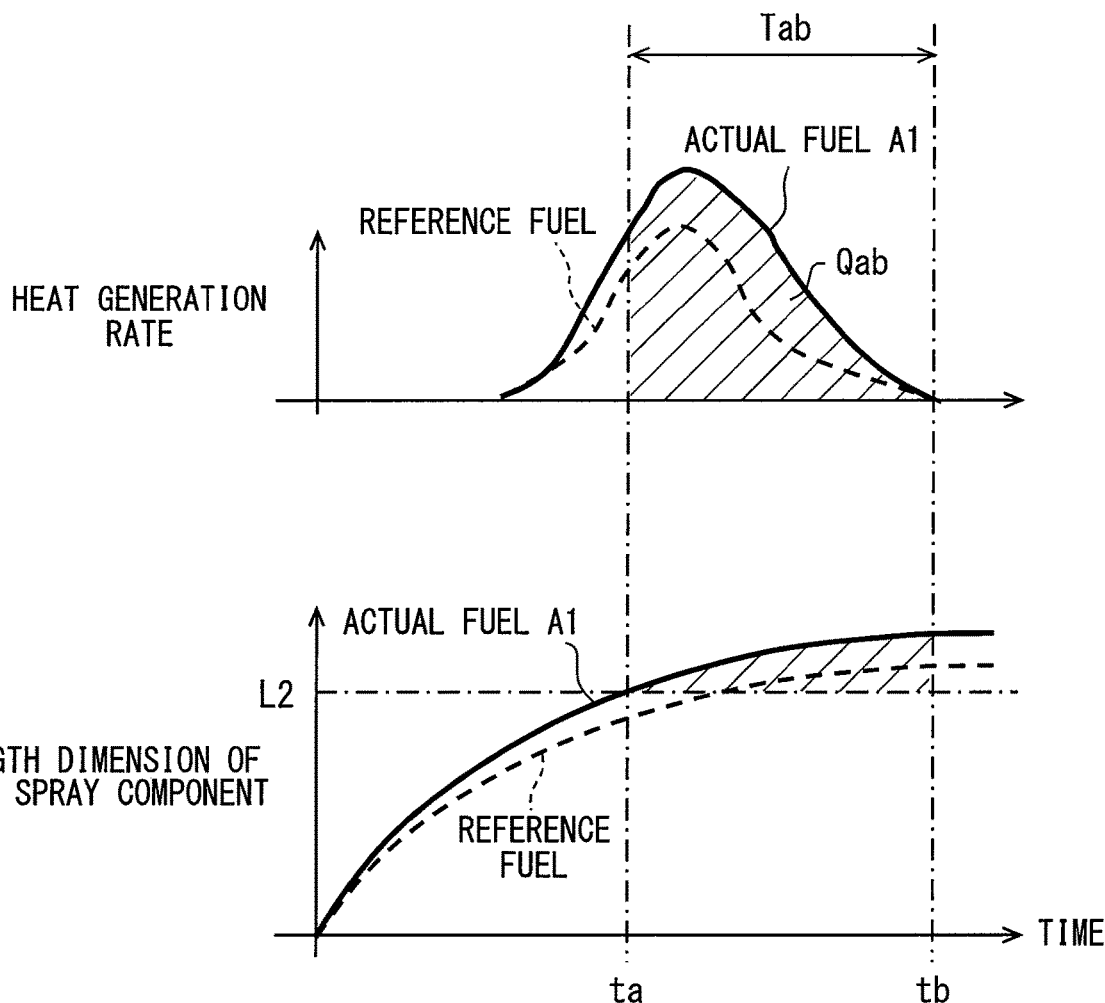
FIG. 24 is a diagram showing a length dimension and a heat generation rate of the main spray component with time.
FIG. 25 is a diagram showing a formula (2).

When the heat generation rate dQi is used, the reaching combustion amount Qi can be calculated by using a formula (2) shown in FIG. 25. In formula (2), it is different from formula (1) in the first embodiment that the reaching combustion amount Qi is calculated by using each heat generation rate dQi.

FIG. 24 shows the length dimension of the main spray component F and the heat generation rate with time, for the fuel A1 used in the first embodiment. As shown in FIG. 24, the fuel A1 is likely to be greater than the reference fuel in both the length dimension of the main spray component and the heat generation rate. In this case, the fuel A1 is likely to be greater than the reference fuel in the lower heat generation amount and the penetration.

According to the second embodiment, since the lower heat generation amount and the penetration are used in the estimation of the reaching combustion amount, an estimation period of the reaching combustion amount can be set to an arbitrary value. In this case, since the reaching combustion amount can be estimated among the main combustion amount except for the combustion amount generated in a period before the main spray component reaches the inner peripheral surface of the combustion chamber 11a, the estimation precision of the reaching combustion amount can be improved. Further, similar to the first embodiment, since the lower heat generation amount and the penetration are estimated based on the actual mixing ratio, the estimation precision of the lower heat generation amount and the penetration used in the estimation of the reaching combustion amount can be ensured appropriately.

Other Embodiments

The disclosure is not at all limited to the preferred embodiments of the disclosure described above and can be implemented in various modified forms as exemplified below. Not only combination between the elements explicitly specified in each of the embodiments to be capable of being combined with each other but also partial combination between the embodiments can be conducted even without explicit expression insofar as the combination is not particularly hindered.

As a modification 1, the mixing ratio estimation unit 82 may not estimate the mixing ratio of the molecular structural species based on the multiple combustion characteristic values, but may detect the general property of the fuel with a sensor, and estimate the mixing ratio based on the detection result. Specific examples of the above general properties include a fuel density, a kinematic viscosity, a distillation temperature, and the like.

Further, the mixing ratio may be estimated based on both of the estimation result with the mixing ratio estimation unit 82 and the detection result of the sensor. For example, the mixing ratio estimated based on one of the estimation result and the detection result may be corrected based on the other. In addition, the mixing ratio may be estimated with different methods depending on the molecular structural species. For example, the mixing ratio of the first molecular structural species is estimated based on the estimation result of the mixing ratio estimation unit 82, and the mixing ratio of the second molecular structural species is estimated based on the detection result of the sensor.

As a modification 2, instead of estimating the mixing ratio of the molecular structural species contained in the fuel, a mixing ratio of components such as hydrogen, carbon, sulfur, nitrogen, and oxygen contained in the fuel may be estimated. For example, an average number of carbon atoms, an average number of hydrogen atoms, an HC ratio which is the ratio of the number of hydrogen atoms to the number of carbon atoms, and the like can be taken as the mixing ratio for hydrogen and carbon. In the present configuration, injection parameters such as the injection amount and combustion parameters such as the combustion amount are estimated based on the mixing ratio of various components. In this way, even in a case where components contained in the actual fuel differ from each other or where the mixing ratio of the components differ, the combustion state caused by main injection of the present cycle can be estimated appropriately. The fuel component such as the average number of carbon atoms can also be referred to as an intermediate parameter.

As a modification 3, the decreasing process of step S109 and the adjustment process of step S110 may be executed without respect to the actual mixing ratio, that is, the decreasing process and the adjustment process may be not executed based on the actual mixing ratio. For example, a configuration may be employed in which the target injection amount and the like to adjust the reaching combustion amount are set without respect to the actual mixing ratio in steps S109 and S110, after the reaching combustion amount is estimated based on the actual mixing ratio in step S105, in the first embodiment.

As a modification 4, the combustion parameter including the combustion amount and the like for the main injection may be estimated by using at least one of four injection parameters including the injection amount and the like in the first embodiment. For example, the combustion region is estimated based on only the penetration. Even in that case, a certain level of estimation precision in estimating the combustion region can be ensured due to the issue that the four injection parameters are correlated with each other.

As a modification 5, in the main injection, the lower heat generation amount may not be used as the injection parameter, but the higher heat generation amount may be used as the injection parameter. In addition, the heat generation amount including both of the lower heat generation amount and the higher heat generation amount may be used as the injection parameter.

As a modification 6, when the total volume Va of the main spray component F is calculated, the injection parameter including injection amount, the lower heat generation amount, or the diffusion state may be used to replace the penetration or may be used in addition of the penetration in the second embodiment.

As a modification 7, the injection parameters such as the injection amount and the combustion parameters such as the combustion amount may not be estimated, individually, for each of the actual mixing ratio and the reference mixing ratio. For example, a difference between the actual mixing ratio and the reference mixing ratio is calculated, and a difference between the injection parameter and the combustion parameter is estimated based on the calculated difference. In that case, the "deviation" between the combustion state of the reference fuel and the combustion state of the actual fuel is directly estimated.

As a modification 8, the combustion parameter including the combustion amount and the like may be estimated without using the injection parameter including the injection amount and the like in the first embodiment. For example, the combustion amount is not estimated based on the injection parameter, but is estimated based on the detection signal of the in-cylinder pressure sensor 21 and the actual mixing ratio. Even in that case, the actual mixing ratio of the fuel can be reflected in the estimation of the combustion amount.

As a modification 9, the reaching volume Vi or the actual volume Vj may be directly calculated based on the combustion parameter including the combustion region and the like or the injection parameter including the penetration and the like, without being calculated from the total volume Va.

As a modification 10, a property sensor for detecting a general property of a fuel may be provided. For example, a fuel tank or a common rail is provided with the property sensor for detecting a kinematic viscosity and a density of the fuel. In this configuration, the average number of carbon atoms and the average number of hydrogen atoms of the fuel may be estimated based on the detection result of the property sensor.

As a modification 11, the in-cylinder temperature may be estimated based on the in-cylinder pressure detected with the in-cylinder pressure sensor 21, instead of being detected with the temperature detection element 21a. More specifically, the in-cylinder temperature is calculated according to the in-cylinder pressure, the cylinder capacity, a gas weight in the cylinder, and a gas constant for estimation.

As a modification 12, the unit and/or the function produced with the ECU 80 as the estimation device and the control device of the combustion system can be produced with software stored in a substantive storage medium and a computer executing the software, with software alone, with hardware alone, or with a combination of the software and the hardware. In a case where the combustion system control device is produced with a hardware circuit, for example, it can be produced with an analog circuit or a digital circuit including multiple logic circuits.

The estimation device 80 according to the first disclosure described above is applicable to the combustion system including the internal combustion engine 10. The estimation device 80 includes the mixing acquisition unit S101, the combustion amount estimation unit S205, and the region estimation unit S206. The mixing acquisition unit S101 acquires a mixing ratio of various components contained in a fuel used for combustion in the internal combustion engine. The combustion amount estimation unit S205 estimates a main combustion amount Qinj of the fuel caused by a main combustion produced by injecting the fuel into a combustion chamber 11a of the internal combustion engine with a main injection, based on the mixing ratio acquired by the mixing acquisition unit. The region estimation unit S206 estimates a combustion region of the main combustion in the combustion chamber based on the mixing ratio acquired by the mixing acquisition unit.

According to the first disclosure, since the main combustion amount and the combustion region of the main combustion are estimated, the reaching combustion amount caused by the reaching fuel reached the inner peripheral surface of the combustion chamber in the fuel injected by the main injection can be calculated. The heat distributed to the inner peripheral surface of the combustion chamber by the reaching combustion amount becomes the heat distributed to the output of the internal combustion engine or the heat disappeared as the cooling loss through a piston or a cylinder or the like constituting the inner peripheral surface of the combustion chamber. Thus, when a calculation precision of the reaching combustion amount becomes higher, a calculation precision of the cooling loss becomes higher.

According to the present disclosure, both the main combustion amount and the combustion region for the main combustion are estimated based on the mixing ratio of various components contained in the fuel. Thus, even the main combustion amount or the combustion region varies in a case where components contained in the fuel differ from each other or where the mixing ratio of the components differ, the reaching combustion amount and the cooling loss for the main combustion amount can be calculated accurately. For example, when the fuel injected by the main injection is a fuel that the main combustion amount is likely to increase while the combustion region is likely to decrease, the reaching combustion amount may not become larger. Further, when the fuel is a fuel that the main combustion amount is likely to decrease while the combustion region is likely to increase, the reaching combustion amount may not become smaller. Thus, when any fuel having various properties is used, the cooling loss caused by the main injection can be managed appropriately.

The estimation device 80 according to the second disclosure described above is applicable to the combustion system including the internal combustion engine 10. The estimation device 80 includes a mixing acquisition unit S101, a heat generation amount estimation unit S301, and a penetration force estimation unit S302.

The mixing acquisition unit S101 acquires a mixing ratio of various components contained in a fuel used for combustion in the internal combustion engine. The heat generation amount estimation unit S301 estimates a generation amount of the fuel caused by the main injection produced by injecting the fuel into a combustion chamber 11a of the internal combustion engine, based on the mixing ratio. The penetration force estimation unit S302 estimates a penetration force of the fuel caused by the main injection, based on the mixing ratio.

According to the second disclosure, since the generation amount of the fuel and the penetration force for the main injection are estimated, the reaching combustion amount caused by the reaching fuel reached the inner peripheral surface of the combustion chamber in the fuel injected by the main injection can be calculated. Thus, the same advantages as those in the first disclosure can be obtained for the cooling loss caused by the main injection.

The control device 80 according to the third disclosure described above is applied to the combustion system having the internal combustion engine 10. The control device 80 includes a mixing acquisition unit S101, a combustion amount estimation unit S205, and a combustion control unit S109, S110. The mixing acquisition unit S101 acquires a mixing ratio of various components contained in a fuel used for combustion in the internal combustion engine. The combustion amount estimation unit S205 estimates a main combustion amount of the fuel caused by a main combustion produced by injecting the fuel into a combustion chamber 11a of the internal combustion engine with a main injection, based on the mixing ratio acquired by the mixing acquisition unit. The region estimation unit S206 estimates a combustion region of the main combustion in the combustion chamber based on the mixing ratio acquired by the mixing acquisition unit. The combustion control unit S109, S110 controls the combustion system based on respective estimation results of the combustion amount estimation unit and the region estimation unit.

According to the third disclosure, the same advantages as those in the first disclosure can be obtained.

The present disclosure has been described with reference to the examples, but the present disclosure is not limited to the examples or the structures. The present disclosure includes various modification examples and modifications within the same range. In addition, it should be understood that various combinations or aspects, or other combinations or aspects, in which only one element, one or more elements, or one or less elements is included to the various combinations or aspects, are included in the scope or the technical idea of the present disclosure.

The invention claimed is:

1. An estimation device applicable to a combustion system including an internal combustion engine, the estimation device comprising:
   a mixing acquisition unit to acquire a mixing ratio of various components contained in the fuel used for combustion in the internal combustion engine;
   a combustion amount estimation unit to estimate a main combustion amount of the fuel caused by a main combustion produced by injecting the fuel into a combustion chamber of the internal combustion engine with a main injection, based on the mixing ratio acquired by the mixing acquisition unit;
   a region estimation unit to estimate a combustion region of the main combustion in the combustion chamber based on the mixing ratio acquired by the mixing acquisition unit, and
   a reaching combustion estimation unit to estimate a reaching combustion amount caused by a reaching fuel reached an inner peripheral surface of the combustion chamber in the fuel injected by the main injection, based on the main combustion amount and the combustion region.

2. The estimation device for the combustion system according to claim 1, further comprising:
   a total estimation unit to estimate a total volume of a diffusion range of the fuel injected by the main injection when it is assumed that a diffusion of the fuel is not limited to an interior of the combustion chamber; and
   a reaching volume estimation unit to estimate a reaching volume disappeared when the fuel reaches the inner peripheral surface of the combustion chamber, among the total volume estimated by the total estimation unit, wherein
   the reaching volume estimation unit is to calculate the reaching combustion amount based on the combustion region, by calculating the reaching combustion amount based on the total volume and the reaching volume.

3. The estimation device for the combustion system according to claim 1, further comprising:
   an air flow acquisition unit to acquire a state of an air flow in the combustion chamber when the main injection is executed, wherein
   the reaching combustion estimation unit is to estimate the reaching combustion amount based on the main combustion amount and the combustion region and further based on the air flow of the combustion chamber acquired by the air flow acquisition unit.

4. The estimation device for the combustion system according to claim 1, further comprising:
   at least one of
      an injection amount estimation unit to estimate an injection amount caused by the main injection, based on the mixing ratio,
      a heat generation amount estimation unit to estimate a heat generation amount of the fuel caused by the main combustion, based on the mixing ratio, a penetration force estimation unit to estimate a penetration force of the fuel caused by the main injection, based on the mixing ratio, or a diffusion estimation unit to estimate a diffusion state of the fuel caused by the main injection, based on the mixing ratio, wherein the combustion amount estimation unit and the region estimation unit are to estimate the main combustion amount and the combustion region based on at least one of the injection amount, the heat generation amount, the penetration force, or the diffusion state.

5. A control device applicable to a combustion system including an internal combustion engine, the control device comprising:

the estimation device for the combustion system according to claim 1; and a combustion control unit to control the combustion system based on respective estimation results of the combustion amount estimation unit and the region estimation unit.

6. The control device for the combustion system according to claim 5, wherein the combustion control unit is to control the combustion system based on the respective estimation results of the combustion amount estimation unit and the region estimation unit and further based on the mixing ratio.

* * * * *